US012772207B2

(12) United States Patent
Cui et al.

(10) Patent No.: US 12,772,207 B2
(45) Date of Patent: Oct. 20, 2026

(54) METHOD FOR TRANSMITTING PAGING EARLY INDICATION (PEI), AND TERMINAL AND NETWORK DEVICE

(71) Applicant: GUANGDONG OPPO MOBILE TELECOMMUNICATIONS CORP., LTD., Dongguan (CN)

(72) Inventors: Shengjiang Cui, Dongguan (CN); Weijie Xu, Dongguan (CN); Chuanfeng He, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 274 days.

(21) Appl. No.: 18/620,203

(22) Filed: Mar. 28, 2024

(65) Prior Publication Data

US 2024/0244583 A1 Jul. 18, 2024

Related U.S. Application Data

(63) Continuation of application No. PCT/CN2021/121890, filed on Sep. 29, 2021.

(51) Int. Cl.
*H04W 68/02* (2009.01)
*H04W 56/00* (2009.01)
(Continued)

(52) U.S. Cl.
CPC ....... *H04W 68/02* (2013.01); *H04W 56/0015* (2013.01); *H04W 72/0446* (2013.01); *H04W 76/28* (2018.02)

(58) Field of Classification Search
CPC ............... H04W 68/02; H04W 68/025; H04W 52/0216; H04W 52/0235; H04W 52/0229; H04W 76/28; H04W 68/005; H04W 76/27; H04W 52/02; H04W 72/232; H04W 52/028; H04W 68/00; H04W 52/0219
(Continued)

(56) References Cited

U.S. PATENT DOCUMENTS

2023/0284183 A1* 9/2023 Li ..................... H04W 52/0216 455/458

FOREIGN PATENT DOCUMENTS

CN 113056951 A 6/2021
WO 2021180206 A1 9/2021

OTHER PUBLICATIONS

International Search Report in the international application No. PCT/CN2021/121890, mailed on Jun. 23, 2022. 6 pages with English translation.

(Continued)

*Primary Examiner* — Ajibola A Akinyemi
(74) *Attorney, Agent, or Firm* — BAYES PLLC

(57) ABSTRACT

Provided are a method for transmitting a paging early indication (PEI), and a terminal and a network device. The method includes that: a terminal receives a first PEI sent by a network device, wherein the first PEI is used for indicating whether the terminal receives paging indication information on a first paging occasion (PO) in a first PO group. A first PEI sent by a network device indicates whether a terminal receives paging indication information on a first PO in a first PO group, and the first PEI can indicate whether the paging indication information needs to be received on the first PO in the first PO group.

20 Claims, 6 Drawing Sheets

(51) Int. Cl.
*H04W 72/0446* (2023.01)
*H04W 76/28* (2018.01)

(58) Field of Classification Search
USPC .......................................................... 455/458
See application file for complete search history.

(56) References Cited

OTHER PUBLICATIONS

Written Opinion of the International Search Authority in the international application No. PCT/CN2021/121890, mailed on Jun. 23, 2022. 6 pages with English translation.

3GPP TSG-RAN WG2 Meeting #115 electronic R2-2108593, Online, Aug. 16-Aug. 27, 2021 , Agenda Item: 8.9.2.2, Source: MediaTek Inc., Title: Paging Monitoring with PEI and UE Subgrouping, Document for: Discussion and decision. section: 1-3. 3 pages.

3GPP TSG-RAN WG2 Meeting #113bis Electronic R2-2103368, Elbonia, Apr. 12-20, 2021 , Agenda item: 8.9.2, Source: Nokia, Nokia Shanghai Bell, Title: Details on paging sub-grouping indication, WID/SID: NR_UE_pow_sav_enh-Core—Release 17, Document for: Discussion and Decision. section 1-3. 3 pages.

3GPP TSG-RAN WG2 Meeting #115 electronic R2-2107069, Online, Aug. 2021, Agenda Item: 8.9.2.2, Source: OPPO, Title: Discussion on PEI monitoring, Document for: Discussion, Decision. section 1-3. 2 pages.

3GPP TS 38.213 V16.6.0 (Jun. 2021), 3rd Generation Partnership Project; Technical Specification Group Radio Access Network; NR; Physical layer procedures for control (Release 16). section :4.1, 10.1. 187 pages.

* cited by examiner

METHOD FOR TRANSMITTING PAGING EARLY INDICATION (PEI), AND TERMINAL AND NETWORK DEVICE

CROSS-REFERENCE TO RELATED APPLICATION

This is a continuation application of International Patent Application No. PCT/CN2021/121890, filed on Sep. 29, 2021, entitled "METHOD FOR TRANSMITTING PAGING EARLY INDICATION (PEI), AND TERMINAL AND NETWORK DEVICE", the disclosure of which is hereby incorporated by reference in its entirety.

BACKGROUND

In order to further optimize a manner for saving energy of a terminal, a scheme based on a PEI to further save energy of the terminal is discussed. In this scheme, before the arrival of a paging occasion (PO) in each discontinuous reception (DRX) cycle (or paging cycle), a network device sends a PEI to the terminal to indicate whether the terminal receives a physical downlink control channel (PDCCH) carrying paging indication information on the PO. The terminal is waked up only when the PEI indicates that the terminal needs to receive PDCCH on a target PO; otherwise, if the PEI indicates that the terminal does not need to receive PDCCH on the target PO, the terminal will remain a sleep state to save energy. However, in this scheme based on a PEI indication, the network device needs to send the PEI to the terminal before each PO arrives, that is, one PEI is used to indicate whether the terminal receives paging indication information on one PO. As a result, the network device cannot flexibly indicate, through the PEI, whether the terminal receives paging indication information on the PO.

SUMMARY

The present disclosure relates to the field of communication technology, in particular to a method for transmitting a paging early indication (PEI), a terminal and a network device. In the present disclosure, there are provided a method for transmitting a paging early indication (PEI), a terminal and a network device, so as to improve the flexibility of the network device to indicate, through the PEI, whether the terminal receives paging indication information.

In a first aspect, there is provided a communication method, which includes that a terminal receives a first PEI from a network device, the first PEI being configured to indicate whether the terminal receives paging indication information on a first paging occasion (PO) in a first PO group.

In a second aspect, there is provided a communication method, which includes that a network device sends a first PEI to a terminal, the first PEI being configured to indicate whether the terminal receives paging indication information on a first PO in a first PO group.

In a third aspect, there is provided a terminal, which includes a memory, a processor and a communication interface. The memory is configured to store a program, and the processor is configured to call the program in the memory to cause the terminal to: receive a first PEI from a network device, the first PEI being configured to indicate whether the terminal receives paging indication information on a first PO in a first PO group.

In a fourth aspect, there is provided a network device, which includes a memory, a processor and a communication interface. The memory is configured to store a program, and the processor is configured to call the program in the memory to cause the network device to: send a first PEI to a terminal, the first PEI being configured to indicate whether the terminal receives paging indication information on a first PO in a PO group.

DETAILED DESCRIPTION

The technical solutions of the present disclosure will be described below with reference to the accompanying drawings.

Figure 1:
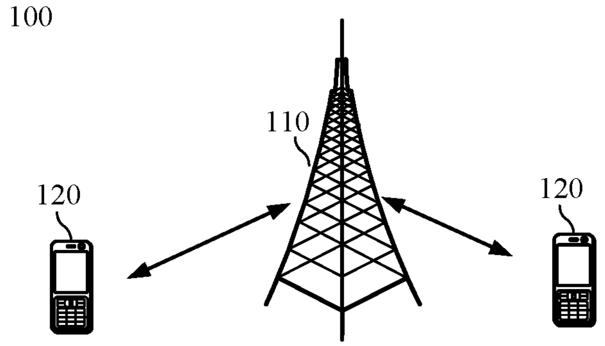
FIG. 1 illustrates a wireless communication system 100 to which embodiments of the present disclosure are applied.

FIG. 1 illustrates a wireless communication system 100 applied in an embodiment of the present disclosure. The wireless communication system 100 may include a network device 110 and terminal devices 120. The network device 110 may be a device that communicates with the terminal devices 120. The network device 110 may provide communication coverage for a particular geographic area and may communicate with the terminal devices 120 located within the coverage area.

FIG. 1 exemplarily illustrates a network device and two terminals. Optionally, the wireless communication system 100 may include multiple network devices and other numbers of terminal devices may be included within the coverage of each network device, which is not limited by the embodiments of the present disclosure.

Optionally, the wireless communication system 100 may also include other network entities such as network controllers, mobility management entities and the like, which are not limited by the embodiments of the present disclosure.

The technical solution of the embodiments of the present disclosure may be applied to various communication systems, such as a 5th generation (5G) system or a new radio (NR), a long term evolution (LTE) system, an LTE frequency division duplex (FDD) system, an LTE time division duplex (TDD) system, etc. The technical solution provided by the present disclosure may also be applied to a future communication system, such as a sixth generation mobile communication system, a satellite communication system, etc.

The terminal device in the embodiments of the present disclosure may also be referred to as user equipment (UE), an access terminal, a user unit, a user station, a mobile platform, a mobile station (MS), a mobile terminal (MT), a remote station, a remote terminal, a mobile device, a user terminal, a terminal, a wireless communication device, a user agent or a user device. The terminal device in the embodiments of the present disclosure may be a device that provides voice and/or data connectivity to the user and may be used to connect people, objects and machines, such as handheld devices with wireless connectivity capabilities, vehicle devices, etc. In the embodiments of the present disclosure, the terminal device may be a mobile phone, a Pad, a notebook computer, a palmtop computer, a mobile internet device (MID), a wearable device, a virtual reality (VR) device, an augmented reality (AR) device, a wireless terminal in an industrial control, a wireless terminal in a self-driving, a wireless terminal in a remote medical surgery, a wireless terminal in a smart grid, a wireless terminal in a transportation safety, a wireless terminal in a smart city, a wireless terminals in a smart home, etc. Optionally, UE may be used as a base station. For example, the UE may act as a scheduling entity that provides sidelink signals between UEs in V2X or D2D or the like. For example, cellular phones and cars communicate with each other using sidelink signals. A communication between a cellular phone and a smart home device without relaying communication signals through a base station.

The network device in the embodiments of the present disclosure may be a device used to communicate with the terminal device. The network device may also be referred to as an access network device or a wireless access network device, for example, the network device may be a base station. The network device in the embodiments of the present disclosure may refer to a radio access network (RAN) node (or a device) that connects a terminal device to a wireless network. The base station may broadly cover or replace the following names, such as a Node B (NodeB), an evolved NodeB (eNB), a next generation NodeB (gNB), a relay station, an access point, a transmitting and receiving point (TRP), a transmitting point (TP), a master station (MeNB), a secondary station (SeNB), a multi-standard wireless (MSR) node, a home base station, a network controller, an access node, a wireless node, an access point (AP), a transmitting node, a transceiver node, a base band unit (BBU), a remote radio unit (RRU), an active antenna unit (AAU), a remote radio head (RRH), a central unit (CU), a distributed unit (DU), a positioning node, and the like. The base station may be a macro base station, a micro base station, a relay node, a donor node or the like, or a combination thereof. The base station may also refer to a communication module, a modem or a chip provided in the above device or equipment. The base station also may be a mobile switching center, a device that performs functions of the base station in device-to-device (D2D), vehicle-to-everything (V2X), and machine-to-machine (M2M) communications, a network-side device in a 6G network, a device that performs functions of the base station in future communication systems, etc. The base station may support networks with the same or different access technologies. The embodiments of the present disclosure are not limited to the specific technology and the specific device form adopted by the network device.

The base station may be fixed or mobile. For example, a helicopter or unmanned aerial vehicle may be configured to act as a mobile base station, and one or more cells may move depending on the position of the mobile base station. In other examples, a helicopter or unmanned aerial vehicle may be configured to serve as a device for communicating with another base station.

In some deployments, the network device in the embodiments of the present disclosure may refer to a CU or a DU, or the network device may include a CU and a DU. gNB may also include an AAU.

The network device and the terminal device may be deployed on land, including indoor or outdoor, hand-held, wearable or in-vehicle. The network device and the terminal device may also be deployed on the water. The network device and the terminal device may also be deployed on airplanes, balloons and satellites on the air, etc. Embodiments of the present disclosure are not limited to the scene in which the network device and terminal device are located.

It should be understood that all or part of the functionality of the communication device in the present disclosure may also be implemented by a software functionality running on hardware or by a virtualization functionality instantiated on a platform (e.g. a cloud platform).

For ease of understanding, a communication procedure according to an embodiment of the present disclosure will be described below with reference to FIG. 2 to FIG. 5.

DRX

In order to reduce the power consumption of the terminal, there is a DRX mechanism in both LTE and NR systems, so that the terminal does not have to open a receiver all the time in a case of no data reception, but enters a state of discontinuous reception, so as to achieve the purpose of power saving. The DRX mechanism includes configuring a DRX cycle for a terminal in a radio resource control (RRC) connected state, and the DRX cycle consists of “on duration” and “opportunity for DRX”. During the on duration, the terminal monitors and receives downlink channels and signals including PDCCH. During the opportunity for DRX, the terminal does not receive downlink channels and signals such as PDCCH to reduce power consumption.

In the evolution of 5G system, higher requirements are put forward for energy saving for the terminal. For the existing DRX mechanism, in each on duration, the terminal needs to detect PDCCH constantly to determine whether the network device schedules data sent to itself. However, for most terminals, there may be no need to receive data transmission for a long time, but they still need to keep waking up regularly to monitor possible downlink transmission. The energy saving method for such terminals can be further optimized.

Figure 2:
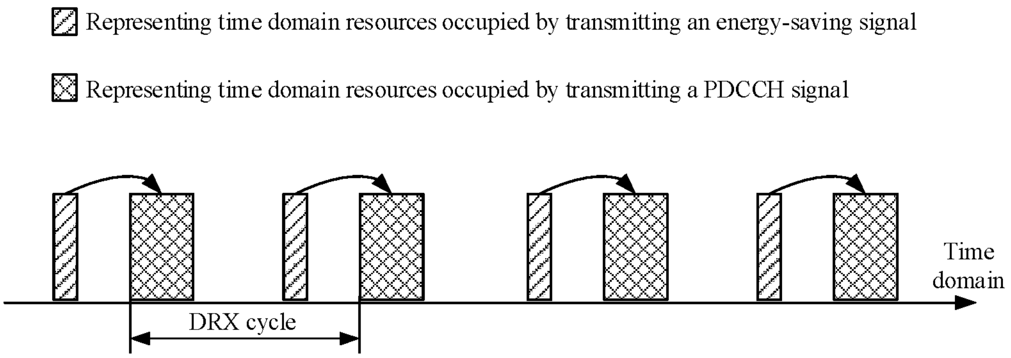
FIG. 2 illustrates a communication process of a DRX mechanism based on an energy-saving signal.

Therefore, in the R16 standard of 5G, an energy-saving signal is introduced to achieve further energy saving. The energy-saving signal may be used in combination with the DRX mechanism, as illustrated in FIG. 2. In this way, before entering the on duration of the DRX, the terminal may first determine whether it is necessary to receive data during the on duration of the DRX based on an indication of the energy-saving signal. When the terminal has data for transmission during a DRX cycle, the energy-saving signal "wakes up" the terminal, and accordingly, the terminal monitors PDCCH during the on duration of the DRX. On the contrary, when the terminal does not transmit data during a DRX cycle, the energy-saving signal does not "wake up" the terminal, and accordingly, the terminal does not need to monitor PDCCH during the on duration of the DRX. In this DRX mechanism combined with the energy-saving signal, if the energy-saving signal does not wake up the terminal in a DRX cycle, the terminal does not need to monitor PDCCH even in the on duration of the DRX, thus realizing energy saving.

Figure 3:
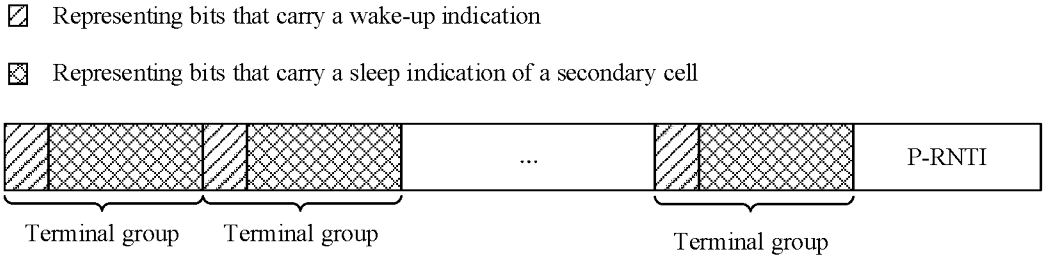
FIG. 3 illustrates a structure of an energy-saving signal.

According to the R16 standard, the energy-saving signal may be carried in a newly defined downlink control information (DCI) format 2_6. Accordingly, the network device may configure a search space set for the terminal to detect the PDCCH carrying DCI format 2_6. In the energy-saving signal, the maximum number of bits required by a single user is 6, of which 1 bit is a wake-up indication used to indicate whether the terminal needs to be woken up. The other 5 bits are a sleep indication of a secondary cell. Of course, if the energy-saving signal may carry indication bits of a plurality of terminals, it is beneficial to improve the use efficiency of transmission resources. FIG. 3 illustrates a structure of an energy-saving signal. Referring to FIG. 3, an energy-saving signal may indicate a terminal group at the same time. A wake-up indication of the terminal group may occupy a starting position of the DCI, and a sleep indication of the secondary cell of each terminal in the terminal group may occupy remaining bits in the DCI. In addition, a tail signal of the energy-saving signal is scrambled by a paging radio network temporary identity (P-RNTI). In some cases, the wake-up indication in the energy-saving signal must be included, but the number of bits occupied by the sleep indication of the secondary cell may be 0. In addition, the network device will also inform the terminal of a total number of bits of DCI and the P-RNTI used to scramble PDCCH, so that the terminal can receive the energy-saving signal correctly.

Generally, there is a mapping relationship between a monitoring occasion for PDCCH used to obtain the energy-saving signal and a time window of the on duration of the DRX on a time domain. The network device configures a time offset (PS-offset) for the terminal, which is used to determine a starting point of PDCCH monitoring occasion. After determining the starting point of PDCCH monitoring occasion, the terminal needs to further determine an ending point of PDCCH monitoring occasion, which is determined by a capability of the terminal. In a minimum time interval before the on duration of the DRX, the terminal needs to wake up the device, perform initialization after waking up and other operations, so the terminal cannot monitor the energy-saving signal in the minimum time interval before the on duration of the DRX. The minimum time interval may be shorter for a terminal with a faster processing speed, but may be long for a terminal with a slower processing speed. Table 1 shows corresponding minimum time intervals for terminals with different capabilities under the same subcarrier interval. The value 1 of the minimum time interval indicates the number of slots occupied by a minimum time interval corresponding to the terminal with a stronger capability. The value 2 of the minimum time interval indicates the number of slots occupied by a minimum time interval corresponding to the terminal with a weaker capability.

TABLE 1

| Subcarrier interval | Minimum time interval | |
|---|---|---|
| (kHz) | Value 1 | Value 2 |
| 15 | 1 | 3 |
| 30 | 1 | 6 |
| 60 | 1 | 12 |
| 120 | 2 | 24 |

Figure 4:
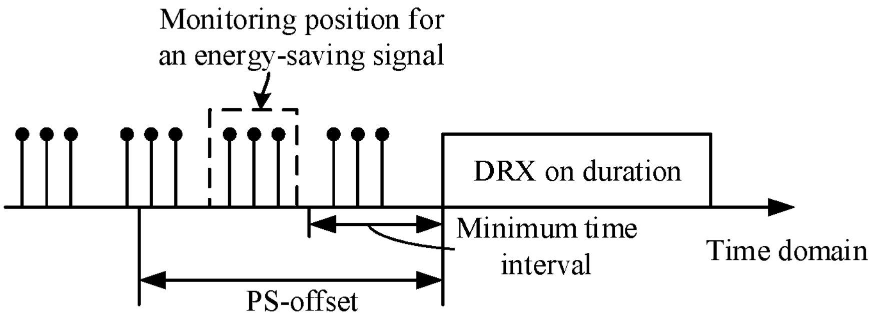
FIG. 4 illustrates a schematic diagram of a monitoring position for an energy-saving signal.

FIG. 4 illustrates a schematic diagram of a monitoring position for an energy-saving signal. Referring to FIG. 4, time domain resources occupied by the energy-saving signal takes a time domain resource indicated by a PS-offset as a starting time domain resource, and the energy-saving signal is monitored within one complete PDCCH monitoring occasion following the starting time domain resource, and the number of time domain resources between a position of a last time domain transmission unit of the time domain resources occupied by the energy-saving signal and a first of time domain resources of the on duration of the DRX is greater than the number of time domain resources included in the minimum time interval. PS-offset may be configured by the network device. In addition, the PDCCH monitoring occasion may be defined by the parameter "duration" of the PDCCH search space.

The process of receiving data by the terminal using the DRX mechanism is described above with reference to FIG. 2 to FIG. 4. For terminals in an RRC idle state, a paging message is usually received in a manner similar to the DRX mechanism. There is a paging occasion (PO) in a DRX cycle. The terminal only receives the paging message during the PO, but does not receive the paging message in a time outside the PO, so as to achieve the purpose of saving power. In addition, during the PO, the terminal may determine whether there is a paging message through detecting PDCCH scrambled by using the P-RNTI. The paging process is described below in combination with FIG. 5.

Paging Process

In an NR system, a network device may send a paging to a terminal in an RRC idle state or an RRC connected state, where the paging process may be triggered by a core network or a base station. The paging process may be used to send a paging request to a terminal in the RRC idle state, or the paging process may also be used to notify the terminal of system information update, or the paging process may also notify the terminal to receive alarm information sent by an earthquake and tsunami warning system (ETWS) and a commercial mobile alert system (CMAS).

If the paging message is initiated by the core network device, after receiving the paging message sent by the core network device, the base station will interpret contents of the paging message, obtain a tracking area identity (TAI) list of the paged terminal, and perform paging of air interface in the cell belonging to a tracking area in the list. Generally, in order to save an overhead of transmitting paging messages, after receiving the paging messages sent by the core network device, the base station may summarize paging messages corresponding to terminals with the same PO into one paging message, and finally transmit it to relevant terminals through a paging channel.

The above paging message is carried through a physical downlink shared channel (PDSCH). Before receiving the paging message, the terminal needs to receive the paging parameters through a system message, and calculate a frame number of the paging frame (PF) where the paging message is located and a PO in combination with the respective UE_ID. Then, the terminal receives paging indication information by monitoring the PDCCH scrambled by the P-RNTI within the PO on the PF, and finally receives the paging message based on the paging indication information.

Figure 5:
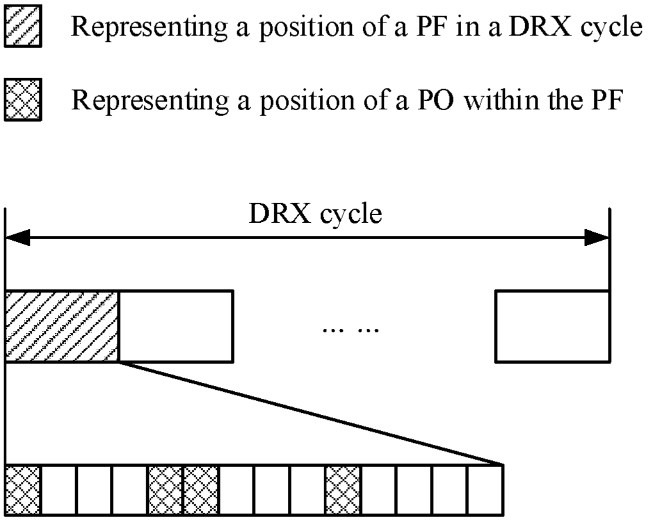
FIG. 5 illustrates a position of a PF during a DRX cycle and positions of POs within the PF.

The above PF represents the frame number of the system frame where the paging message should appear, and the PO represents the time when the paging message may appear. FIG. 5 illustrates a position of a PF during a DRX cycle and positions of POs within the PF. As illustrated in FIG. 5, the PF is located within the DRX cycle (or a paging cycle), and one PF may include one or more POs, and the plurality of POs may correspond to different terminals. However, for a certain terminal, during the DRX cycle (or the paging cycle), the terminal only needs to monitor its own PO.

As described above, the terminal may calculate the PF and PO based on UE_ID. In some implementations, a system frame corresponding to a system frame number (SFN) satisfying a formula (SFN+PF_offset) mod T=(T div N)*(UE_ID mod N) may be taken as a PF, and in the PF, an index i_s of the PO corresponding to the terminal may be calculated according to a formula i_s=floor (UE_ID/N) mod Ns. T represents a cycle length of the DRX cycle of the terminal; UE_ID is used to identify the terminal; N represents the number of PFs in the DRX cycle; Ns represents the number of POs in one PF. PF_offset represents a frame offset of PF.

It should be noted that, for a terminal, if a default DRX cycle is different from a DRX cycle configured for the terminal, a cycle length of a smaller of the two DRX cycles may be selected as the above T. That is, T=min (T_UE, T_sib), where T_sib represents a cycle length of a default DRX cycle indicated in a system message, and T_UE represents a cycle length of a DRX cycle configured by the terminal. Of course, if for a terminal that is not configured with T_UE, the cycle length of the default DRX cycle indicated in the system message may be used as the value of T, that is, T=T_sib.

It should also be noted that the above UE_ID may be calculated by a formula UE_ID=(5G-S-TMSI mod 1024), where 5G-S-TMSI represents a temporary mobile subscriber identity (TMSI) assigned by the communication system to the terminal.

In addition, in an NR technology, for a terminal in the RRC idle state, the network device does not know which transmit beam to be used to send a paging message for the terminal. In order to ensure that the terminal can receive the paging message, the network device sends the paging message in a manner of beam scanning. In order to support multi-beam transmission for the paging message, PO may be defined as a set of PDCCH monitoring occasions, and different PDCCH monitoring occasions correspond to paging indication information transmitted through different transmit beams. One PF may include one or more POs or starting time points of POs.

For a case where a search space identification (SearchSpaceId) of the paging search space is 0, each synchronization signal block (SSB) index corresponds to a PDCCH monitoring occasion and different SSB indexes correspond to different beams. In this way, a plurality of PDCCH monitoring occasions in a PO may be associated with transmit beams corresponding to different SSB indexes, to support multi-beam transmission of the paging message. Usually, SSBs required to complete a beam scanning constitute an "SSB burst set".

For a case where the SearchSpaceId of the paging search space is not 0, one PO includes "S*X" consecutive PDCCH monitoring occasions, where S is the number of SSBs transmitted within the PO, which is indicated by a "ssb-PositionsInBurst" field in system information block 1 (SIB1). X represents the number of PDCCH monitoring a occasions for each SSB, which may be indicated by "nrofPDCCH-MonitoringOccasionPerSSB-InPO" field in SIB. If the parameter is not configured, X is 1. A [x*S+K]-th PDCCH monitoring occasion in a PO corresponds to a K-th actual transmitted SSB, where x=0, 1, . . . , X−1, K=1, 2, . . . , S. For example, if S=8 and X=2, a PO includes 16 PDCCH monitoring occasions, and SSB indexes corresponding to the 16 PDCCH monitoring occasions in chronological order are "0123456701234567", in which the index numbers of the first 8 SSBs are 0-7.

Based on the above introduction, it can be seen that the terminal will adopt a manner similar to the DRX mechanism, taking the DRX cycle as a cycle, and monitoring PDCCH periodically in POs to obtain paging indication information. However, some terminals may not be paged for a long period of time, but still need to keep waking up periodically to monitor PDCCH that may carry paging indication information. The energy saving method of such terminals can be further optimized.

In order to further optimize the energy saving manner of the terminal, a scheme based on a paging early indication (PEI) to further save the terminal energy is discussed. In this scheme, the network device sends a PEI to the terminal to indicate whether the terminal receives PDCCH carrying paging indication information on the PO before the arrival of POs in each DRX cycle (or paging cycle). The terminal is waked up only when the PEI indicates that the terminal needs to receive PDCCH on the target PO. Otherwise, if the PEI indicates that the terminal does not need to receive PDCCH on the target PO, the terminal will remain asleep to save energy. However, in this scheme based on a PEI indication, the network device needs to send the PEI to the terminal before each PO arrives, that is, one PEI is used to indicate whether the terminal receives paging indication information on one PO. As a result, the network device cannot flexibly indicate, through the PEI, whether the terminal receives paging indication information on the PO.

Therefore, in order to avoid the above problems, the present disclosure provides a method of transmitting a PEI, including that the first PEI from a network device is configured to indicate whether the terminal receives paging indication information on a first PO in a first PO group, where the first PO group may include one or more POs. The method avoids that one PEI may only indicate whether the terminal receives paging indication information on one PO in the traditional PEI indication, and is conducive to improving the flexibility of the network device to indicate, through the PEI, whether the terminal receives paging indication information.

On the other hand, when the PO group includes a plurality of POs, the first PEI may indicate whether paging indication information needs to be received on the plurality of POs. The method avoids that the network device needs to send multiple PEIs to indicate whether to receive paging indication information on multiple POs in the traditional PEI indication, and is conducive to reducing the overhead of PEI transmission by the network device.

Figure 6:
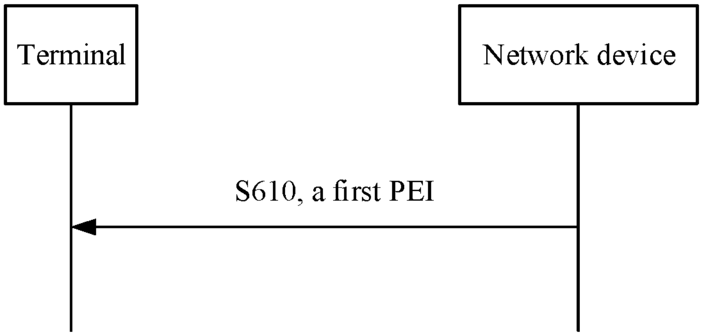
FIG. 6 is a flow diagram of a communication method according to an embodiment of the present disclosure.

A communication method of an embodiment of the present disclosure will be described below with reference to FIG. 6. FIG. 6 is a flow diagram of a communication method provided by an embodiment of the present disclosure. The method illustrated in FIG. 6 includes operation S610.

At S610, the network device transmits a first PEI to the terminal.

The first PEI is configured to indicate whether the terminal receives paging indication information on a first PO in a first PO group. Optionally, the above first PEI is configured to indicate the terminal to receive or not to receive the paging indication information on a first PO in a first PO group. Optionally, the first PEI is configured to indicate whether the terminal needs to monitor a PDCCH carrying paging indication information on a first PO in the first PO group.

The first PO group may include one or more POs, or the first PO group may include at least one PO. The first PO group includes one PO, which may be understood as the first PEI is used to indicate one PO. The first PO group includes a plurality of POs, which may be understood as the first PEI is used to indicate the plurality of POs, and the plurality of POs may correspond to a plurality of terminals. When the plurality of POs correspond to a plurality of terminals, each terminal may calculate a respective corresponding PO based on a UE_ID of the terminal in the manner described above. For brevity, details are not repeated here. Of course, the terminals may also determine their corresponding POs based on other manners.

In some implementations, the first PEI may be carried by the PDCCH, and the monitoring occasion for the first PEI is the monitoring occasion for the PDCCH carrying the first PEI. In other implementations, the first PEI may also be carried by a reference signal, so the monitoring occasion for the first PEI is a transmission occasion for the reference signal. For example, the first PEI may be carried by a tracking reference signal (TRS), and the monitoring occasion for the first PEI is a transmission occasion for the TRS. For another example, the first PEI may be carried by a channel state information reference signal (CSI-RS), and the monitoring occasion for the first PEI is a transmission occasion for the CSI-RS. In other implementations, the first PEI may also be carried by a synchronization signal, so the monitoring occasion for the first PEI is a transmission occasion for the synchronization signal. For example, if the first PEI is carried by a secondary synchronization signal (SSS), the monitoring occasion for the first PEI is a transmission occasion for the SSS.

In the embodiments of the present disclosure, there are many grouping manners for the first PO group. For example, a PO group may be divided based on a position of a time domain resource where a PO is located, the number of POs included in the PO group, or an index of the SSB, which is used by the terminal corresponding to the PO, for time-frequency synchronization or automatic generation control (AGC). Several typical grouping manners in the embodiments of the present disclosure are described below.

A first grouping manner is to divide PO groups based on the position of the time domain resource where the PO is located.

In order to facilitate the first PEI for indication, positions of time domain resources occupied by a plurality of POs included in the first PO group may generally be relatively close. For example, the first PO group includes part or all of POs within the first PF in which the first PO is located. As another example, the first PO group includes part or all of POs in a transmission cycle of a first SSB burst set in which the first PO is located. As another example, the first PO group includes part or all of POs in a first paging cycle in which the first PO is located. As another example, the first PO group includes part or all of POs in a first DRX cycle in which the first PO is located.

It should be noted that when PO groups are divided based on the above grouping manner, the number of POs included in different PO groups among a plurality of PO groups may be different. Of course, in some cases, different PO groups in the plurality of PO groups may include a same number of POs.

Of course, in the embodiments of the present disclosure, the POs in the first PO group may also be located in a plurality of different PFs, or the number of PFs in which the POs in the first PO group is located is M, where M is a positive integer greater than 1. For example, the PFs in which the POs in the first PO group are located include a first PF and a second PF, where the first PF and the second PF are different PFs.

The POs in the first PO group may also be located in a plurality of different SSB burst sets, or the number of SSB burst sets in which the POs in the first PO group is located is P, where P is a positive integer greater than 1. For example, the SSB burst sets of the POs in the first PO group includes a first SSB burst set, a second SSB burst set and a third SSB burst set, where the first SSB burst set, the second SSB burst set and the third SSB burst set are different SSB burst sets.

The POs in the first PO group may also be located in a plurality of different paging cycles, or the number of paging cycles in which the POs in the first PO group is located is Q, where Q is a positive integer greater than 1. For example, the paging cycles of the POs included in the first PO group includes a first paging cycle, a second paging cycle, a third paging cycle and a fourth paging cycle, where the first paging cycle, the second paging cycle, the third paging cycle and the fourth paging cycle are different paging cycles.

The POs in the first PO group may also be located in different DRX cycles, or the number of DRX cycles in which the POs in the first PO group is located is K, where K is a positive integer greater than 1. For example, the DRX cycles of the POs included in the first PO group includes a first DRX cycle, a second DRX cycle and a third DRX cycle, and the first DRX cycle, the second DRX cycle and the third DRX cycle are different DRX cycles.

A second grouping manner is to divide a PO, which corresponds to a terminal performing time-frequency synchronization and/or AGC based on the same SSB burst set, into a PO group.

Typically, there may be a plurality of POs after an SSB burst set, or there may be a plurality of POs between two adjacent SSB burst sets. Then, the plurality of POs between two adjacent SSB burst sets may be divided into a PO group, or a PO corresponding to a terminal that performs time-frequency synchronization and/or AGC based on the same SSB burst set may be divided into a PO group.

A third grouping manner is to divide PO groups based on the number of POs included in the PO groups.

That is, the first PO group is one of a plurality of PO groups, and different PO groups in the plurality of PO groups include a same number of POs.

It should be noted that in the case of dividing PO groups based on the above third grouping manner, there may be a case that POs included in a PO group belong to different PFs. For example, it is assumed that PF1 includes 3 POs, PF2 includes 2 POs, and the number of POs included in the PO group is 2. Then, the two POs included in PO group 1 may be the first two POs on PF1, and the two POs included in PO group 2 are the last PO on PF1 and the first PO on PF2, respectively. Of course, similar to the above, in the case of dividing PO groups based on the above third grouping manner, there may be a case that POs included in one PO group belong to different SSB burst sets. Optionally, in the case of dividing PO groups based on the above third grouping manner, there may be a case that POs included in one PO group belong to different paging cycles. Optionally, in the case of dividing PO groups based on the above third grouping manner, there may be a case that POs included in one PO group belong to different DRX cycles.

In some implementations, the number of POs included in the PO group may be pre-configured by the network device. Of course, the number of POs included in the PO group is also predefined by protocol, and the embodiments of the present disclosure are not limited thereto.

A fourth grouping manner is to divide PO groups based on the number of POs included in the PO group, and a position of a time domain resource where a PO is located.

That is, the first grouping manner and the third grouping manner may be used in combination. However, to prevent conflicts, a priority between the two factors may be set. In some implementations, it is assumed that a factor of the position of the time domain resource where the PO is located has a higher priority than a factor of the number of POs included in the PO group, relevant provisions for the number of POs included in the PO group are not always satisfied in a case that relevant provisions for the position of the time domain resource where the PO is located are satisfied.

For example, the relevant provisions for the position of the time domain resource where the PO is located are as follows: POs in the PO group belong to the same PF. In addition, the related provisions for the number of POs included in the PO group are as follows: the number of POs included in the PO group is 4. If PF1 includes 7 POs, these 7 POs may be divided into 2 PO groups: PO group 1 and PO group 2. The first 4 POs within PF1 may be included in PO group 1, and the last 3 POs within PF1 may be included in PO group 2. In this case, the number of POs in PO group 2 does not meet that the number of POs included in PO group is 4.

In other implementations, it is assumed that the position of the time domain resource where the PO is located has a lower priority than that of the number of POs included in the PO group, the relevant provisions for the position of the time domain resource where the PO group is located are not always satisfied in the case that the relevant provisions for the number of POs included in the PO group are satisfied.

For example, the relevant provisions for the position of the time domain resource where the PO is located are as follows: POs in the PO group belong to the same PF. The relevant provisions for the number of POs included in the PO group are as follows: the number of POs included in the PO group is 3. If PF1 includes 5 POs, that is, PO1~PO5, and PF2 includes one PO, that is, PO6. Then the above 6 POs (i.e., PO1~PO6) may be divided into PO group 1 and PO group 2. The first 3 POs in PF1, i.e. PO1 to PO3, may be included in PO group 1, and PO4 and PO5 in PF1 and PO6 in PF2 may be included in PO group 2. In this case, the position of the time domain resource where the PO group is located in the PO group 2 does not belong to the same PF, that is, the relevant regulations for the position of the time domain resource where the PO group is located are not satisfied.

Of course, in the embodiments of the present disclosure, in addition to divide PO groups in advance based on some parameters, PO groups may also be formed naturally based on the transmission manner of PEI.

That is, POs located within a target time domain resource belong to the first PO group, the target time domain resource is a time domain resource region between a second time domain resource corresponding to the first PEI and a third time domain resource corresponding to a second PEI, and the second PEI is a next PEI, sent after the first PEI, among a plurality of PEIs.

In some implementations, the second time domain resource corresponding to the first PEI is a last time domain unit in a first guard interval, and the first guard interval is a guard interval located after a time domain resource occupied by transmitting the first PEI, and/or the third time domain resource corresponding to the second PEI is a last time domain unit in a second guard interval, and the second guard interval is a guard interval located after a time domain resource occupied by transmitting the second PEI.

It should be noted that the above time domain unit may be understood as a unit used for dividing time domain resources. In some implementations, the above time domain unit may be a minimum time domain unit used for dividing time domain resources, for example, a time domain symbol. Of course, the above time domain unit may also be other time domain units used for dividing time domain resources, for example, a slot, a subframe and the like.

In other embodiments, the second time domain resource may also be a first of time domain resources for transmitting the first PEI, and the third time domain resource may also be a first of time domain resources for transmitting the second PEI. Of course, the second time domain resource may also be a last time domain resource for transmitting the first PEI, and the third time domain resource may also be a last time domain resource for transmitting the second PEI. The following takes the scenario of transmitting PEIs periodically as an example, the division of PO groups will be introduced in combination with FIG. 12. For brevity, details are not repeated here.

It should be noted that in the division manner of PO groups described above, for convenience of understanding, one PO group including a plurality of POs is taken as an example. However, in the embodiments of the present disclosure, one PO group may also include only one PO, and the PO groups may be divided in the same manner as when the PO group includes a plurality of POs, as described above in detail. For brevity, details are not repeated here.

In some cases, the terminal is in an RRC idle state, and the network device cannot determine which transmit beam to be used to transmit the PEI. Therefore, in order to improve a possibility that the terminal has received the PEI, the network device may send the first PEI to the terminal in a manner of beam scanning. Since the manner of beam scanning is usually implemented in a manner of time division multiplexing in the current communication system, when the first PEI is transmitted in the manner of beam scanning, the time unit occupied by the first PEI may be a collection of a plurality of time units, where different time units in the plurality of time units may correspond to different beams. Therefore, in the embodiments of the present disclosure, the first PEI may also be referred to as a "first PEI burst set". Of course, in the embodiments of the present disclosure, for a communication system that does not support multi-beam technology, the network device may also adopt a wider beam to transmit the first PEI. At this time, the time domain resource occupied by transmitting the first PEI may be one time unit.

It should be noted that in the embodiments of the present disclosure, a size of the time domain resources occupied by transmitting the first PEI may be fixed. In some implementations, the fixed size described above may be predefined or may be configured by the network device. Of course, in other embodiments, the above size of the time domain resources occupied by transmitting the first PEI may be varied. For example, the size of the time domain resources occupied by transmitting the first PEI may be indicated by the network device.

As described above, when the network device sends the first PEI, the terminal may be in the opportunity for DRX. In order to receive the first PEI, the terminal needs to first determine a first time domain resource occupied by transmitting the first PEI, and receive the first PEI sent by the network device on the first time domain resource.

If a transmission position of the PEI is associated with each PO according to a prior manner, in the case that the first PO group includes a plurality of POs in the embodiments of the present disclosure, in order to make time domain resources for transmitting the PEI, which are calculated by each terminal based on a respective corresponding PO, the same, it is necessary to configure the independent calculation manners for different terminals, which increases the complexity of the mapping relationship between the PO and the PEI.

Therefore, in order to avoid the above problems, the present disclosure also provides a method to determine the time domain resources occupied by transmitting the first PEI. That is, a positional relationship between the first time domain resource and the time domain resources occupied by the first PO group may be established. Thus, the network device may determine the first time domain resource based on time domain resources occupied by the first PO group and a positional relationship between time domain resources occupied by PO groups and time domain resources occupied by transmitting PEIs. Accordingly, the terminal may also determine the first time domain resource based on time domain resources occupied by the first PO group and a positional relationship between time domain resources occupied by PO groups and time domain resources occupied by transmitting PEIs. Of course, this manner of determining the time domain resources occupied by transmitting the first PEI is also applicable to a scenario where only one PO is included in the first PO group. For the sake of brevity, the following mainly takes a PO group including multiple POs as an example.

Figure 7:
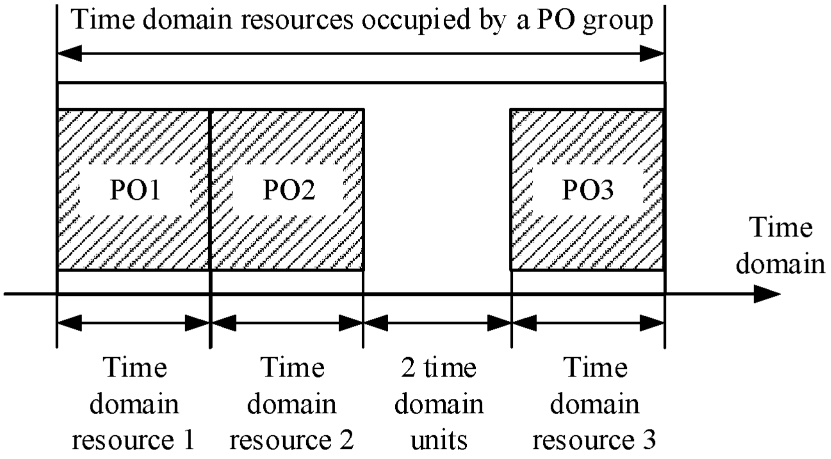
FIG. 7 illustrates a schematic diagram of time domain resources occupied by a PO group according to an embodiment of the present disclosure.

It should be noted that the time domain resources occupied by the first PO group may be understood as continuous time domain resources, and in this continuous time domain resources, only part of the time domain resources may be time domain resources corresponding to POs in the first PO group. Time domain resources occupied by the PO group in the embodiments of the present disclosure are described below with reference to FIG. 7. Referring to FIG. 7, the first PO group includes PO1, PO2 and PO3, where a time domain resource occupied by PO1 is time domain resource 1, a time domain resource occupied by PO2 is time domain resource 2, and a time domain resource occupied by PO3 is time domain resource 3. Positions of time domain resource 1, time domain resource 2 and time domain resource 3 in the time domain are that a position of time domain resource 1 in the time domain is earlier than that of time domain resource 2 in the time domain, a position of time domain resource 2 in the time domain is earlier than that of time domain resource 3 in the time domain, and time domain resource 1 and time domain resource 2 are continuous resources in the time domain, and time domain resource 2 and time domain resource 3 are separated by two time domain units in the time domain. At this time, the time domain resource occupied by the above PO group is continuous time domain resources, and a starting position of the continuous time domain resources may be a starting position of the time domain resource 1 in the time domain, and an ending position of the continuous time domain resources may be an ending position of the time domain resource 3 in the time domain.

In some implementations, the positional relationship between the time domain resources occupied by the PO groups and the time domain resources occupied by transmitting PEIs may be represented by a first offset value. Of course, the above positional relationship may also be calculated by a formula. Embodiments of the present disclosure are not limited thereto. Several possible setting manners of the first offset value in the embodiments of the present disclosure are described below. For ease of illustration, "a reference time domain resource" is used below to indicate time domain resources occupied by a PO group.

According to setting manner 1, the reference time domain resource is a starting time domain symbol in time domain symbols where any PO in the PO group is located. Accordingly, the first offset value is an offset value between the reference time domain resource and time domain resources occupied by transmitting the PEI.

Any one of the above PO group may include a first PO in the PO group, or a last PO in the PO group, and of course, may be a certain PO in the PO group. Embodiments of the present disclosure are not limited thereto.

The time domain resources occupied by transmitting the PEI may include a first time domain resource in the time domain resources occupied by transmitting the PEI. The time domain resources occupied by transmitting the PEI may also be a last time domain resource in the time domain resources occupied by transmitting the PEI. Of course, the time domain resources occupied by transmitting the PEI also may be any one of the time domain resources occupied by transmitting the PEI. Embodiments of the present disclosure are not limited thereto.

The above time domain resource may be any transmission unit in the time domain, which is not limited by the embodiments of the present disclosure. For example, the time domain resource may be a subframe, the time domain resource may also be a frame, the time domain resource may also be a slot, and the time domain resource may also be a time domain symbol.

It should be noted that in some cases, "time domain resources occupied by transmitting the PEI" above are resources actually occupied by transmitting the PEI. In other cases, "time domain resources occupied by transmitting the PEI" above may not be the resources actually occupied by transmitting the PEI, but may only be the resources related to the time domain resources occupied by transmitting the PEI. For example, when the above time domain resources are frames, the time domain resources occupied by transmitting the PEI may be understood as the frames occupied by transmitting the PEI, and the time domain resources actually occupied by transmitting the PEI may not occupy a starting position of the frames. At this time, if the first offset value is an offset value between the reference time domain resource and the starting position of the frames occupied by transmitting the PEI, the time domain resources occupied by transmitting the PEI are not actual time domain resources for really transmitting the PEI. Of course, when the above time domain resources are subframes or slots, a similar situation will occur. In addition, based on similar scenarios, the above reference time domain resource may be a time domain resource related to the time domain resources occupied by the PO group, and are not a real time domain resource occupied by the PO group.

The position of the reference time domain resource may be specified by the network device or may be predefined by protocol. Embodiments of the present disclosure are not limited thereto.

Figure 8:
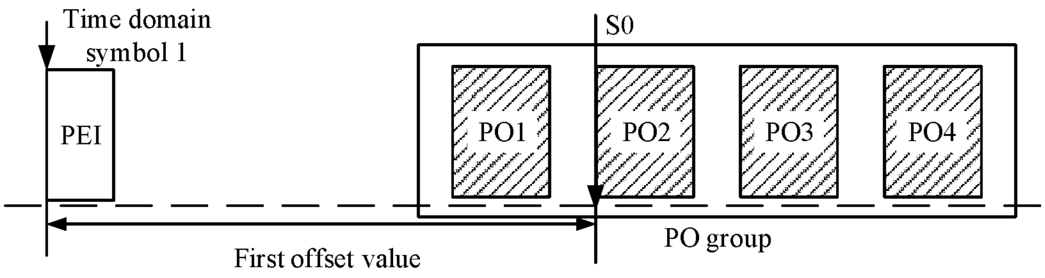
FIG. 8 illustrates a setting manner of a first offset value according to an embodiment of the present disclosure.

In combination with FIG. 8, a setting manner of the first offset value of the embodiments of the present disclosure is described by taking that a time domain resource occupied by transmitting the PEI is a starting time domain symbol for transmitting the PEI and the reference time domain resource is a starting time domain symbol occupied by PO2 as an example.

Referring to FIG. 8, it is assumed that the PO group includes 4 POs, and a position order of these 4 POs in the time domain is: a time domain symbol occupied by PO1 is earlier than that occupied by PO2, a time domain symbol occupied by PO2 is earlier than that occupied by PO3, and a time domain symbol occupied by PO3 is earlier than that occupied by PO4. The reference time domain resource is a starting time domain symbol of PO2 in the PO group. The starting time domain symbol for transmitting the PEI is time domain symbol 1. Then, the first offset value is an offset value between reference time domain symbol S0 and time domain symbol 1. Optionally, the first offset value is equal to the number of time domain symbols between the reference time domain symbol S0 and the time domain symbol 1.

According to setting manner 2, the reference time domain resource is a starting position of a slot where any PO in the PO group is located. Accordingly, the first offset value is an offset value between the reference time domain resource and time domain resources occupied by transmitting the PEI.

Any one of the above PO group may include a first PO in the PO group, or a last PO in the PO group, and of course, may be a certain PO in the PO group. Embodiments of the present disclosure are not limited thereto.

The time domain resources occupied by transmitting the PEI may include a first time domain resource in the time domain resources occupied by transmitting the PEI. The time domain resources occupied by transmitting the PEI may also be a last time domain resource in the time domain resources occupied by transmitting the PEI. Of course, the time domain resources occupied by transmitting the PEI also may be any one of the time domain resources occupied by transmitting the PEI. Embodiments of the present disclosure are not limited thereto.

The above time domain resource may be any transmission unit in the time domain, which is not limited by the embodiments of the present disclosure. For example, the time domain resource may be a subframe, the time domain resource may also be a frame, the time domain resource may also be a slot, and the time domain resource may also be a time domain symbol.

It should be noted that in some cases, "time domain resources occupied by transmitting the PEI" above are resources actually occupied by transmitting the PEI. In other cases, "time domain resources occupied by transmitting the PEI" above may not be the resources actually occupied by transmitting the PEI, but may only be the resources related to the time domain resources occupied by transmitting the PEI. For example, when the above time domain resource are frames, the time domain resources occupied by transmitting the PEI may be understood as the frames occupied by transmitting the PEI, and the time domain resources actually occupied by transmitting the PEI may not occupy a starting position of the frames. At this time, if the first offset value is an offset value between the reference time domain resource and the starting position of the frames occupied by transmitting PEIs, the time domain resource occupied by transmitting the PEI are not actual time domain resources for really transmitting the PEI. Of course, when the above time domain resources are subframes or slots, a similar situation will occur. In addition, based on similar scenarios, the above reference time domain resource may be a time domain resource related to the time domain resources occupied by the PO group, and are not a real time domain resource occupied by the PO group.

The position of the reference time domain resource may be specified by the network device or may be predefined by protocol. Embodiments of the present disclosure are not limited thereto.

According to setting manner 3, the reference time domain resource is a starting position of a subframe where any PO in the PO group is located. Accordingly, the first offset value is an offset value between the reference time domain resource and time domain resources occupied by transmitting the PEI.

Any one of the above PO group may include a first PO in the PO group, or a last PO in the PO group, and of course, may be a certain PO in the PO group. Embodiments of the present disclosure are not limited thereto.

The time domain resources occupied by transmitting the PEI may include a first time domain resource in the time domain resources occupied by transmitting the PEI. The time domain resources occupied by transmitting the PEI may also be a last time domain resource in the time domain resources occupied by transmitting the PEI. Of course, the time domain resources occupied by transmitting the PEI also may be any one of the time domain resources occupied by transmitting the PEI. Embodiments of the present disclosure are not limited thereto.

The above time domain resource may be any transmission unit in the time domain, which is not limited by the embodiments of the present disclosure. For example, the time domain resource may be a subframe, the time domain resource may also be a frame, the time domain resource may also be a slot, and the time domain resource may also be a time domain symbol.

It should be noted that in some cases, "time domain resources occupied by transmitting the PEI" above are resources actually occupied by transmitting the PEI. In other cases, "time domain resources occupied by transmitting the PEI" above may not be the resources actually occupied by transmitting the PEI, but may only be the resources related to the time domain resources occupied by transmitting the PEI. For example, when the above time domain resource is are frames, the time domain resources occupied by transmitting the PEI may be understood as the frames occupied by transmitting the PEI, and the time domain resources actually occupied by transmitting PEIs may not occupy a starting position of the frames. At this time, if the first offset value is an offset value between the reference time domain resources and the starting position of the frames occupied by transmitting the PEI, the time domain resource occupied by transmitting the PEI are not actual time domain resources for really transmitting the PEI. Of course, when the above time domain resources are subframes or slots, a similar situation will occur. In addition, based on similar scenarios, the above reference time domain resource may be a time domain resource related to the time domain resources occupied by the PO group, and are not a real time domain resource occupied by the PO group.

The position of the reference time domain resource may be specified by the network device or may be predefined by protocol. Embodiments of the present disclosure are not limited thereto.

According to setting manner 4, the reference time domain resource is a starting position of a frame where any PO in the PO group is located. Accordingly, the first offset value is an offset value between the reference time domain resource and time domain resources occupied by transmitting the PEI.

Any one of the above PO group may include a first PO in the PO group, or a last PO in the PO group, and of course, may be a certain PO in the PO group. Embodiments of the present disclosure are not limited thereto.

The time domain resources occupied by transmitting the PEI may include a first time domain resource in the time domain resources occupied by transmitting the PEI. The time domain resources occupied by transmitting the PEI may also be a last time domain resource in the time domain resources occupied by transmitting the PEI. Of course, the time domain resources occupied by transmitting the PEI also may be any one of the time domain resources occupied by transmitting the PEI. Embodiments of the present disclosure are not limited thereto.

The above time domain resource may be any transmission unit in the time domain, which is not limited by the embodiments of the present disclosure. For example, the time domain resource may be a subframe, the time domain resource may also be a frame, the time domain resource may also be a slot, and the time domain resource may also be a time domain symbol.

It should be noted that in some cases, "time domain resources occupied by transmitting the PEI" above are resources actually occupied by transmitting the PEI. In other cases, "time domain resources occupied by transmitting the PEI" above may not be the resources actually occupied by transmitting the PEI, but may only be the resources related to the time domain resources occupied by transmitting the PEI. For example, when the above time domain resource are frames, the time domain resources occupied by transmitting the PEI may be understood as frames occupied by transmitting the PEI, and the time domain resources actually occupied by transmitting the PEI may not occupy a starting position of the frames. At this time, if the first offset value is an offset value between the reference time domain resource and the starting position of the frames occupied by transmitting the PEI, the time domain resource occupied by transmitting PEIs are not actual time domain resources for really transmitting the PEI. Of course, when the above time domain resources are subframes or slots, a similar situation will occur. In addition, based on similar scenarios, the above reference time domain resource may be a time domain resource related to the time domain resources occupied by the PO group, and are not a real time domain resource occupied by the PO group.

The position of the reference time domain resource may be specified by the network device or may be predefined by protocol. Embodiments of the present disclosure are not limited thereto.

According to setting manner 5, the reference time domain resource is a starting time domain symbol in time domain symbols occupied by the PO group. Accordingly, the first offset value is an offset value between the reference time domain resource and time domain resources occupied by transmitting the PEI.

The time domain resources occupied by transmitting the PEI may include a first time domain resource in the time domain resources occupied by transmitting the PEI. The time domain resource occupied by transmitting the PEI may also be a last time domain resource in the time domain resources occupied by transmitting the PEI. Of course, the time domain resources occupied by transmitting the PEI also may be any one of the time domain resources occupied by transmitting the PEI. Embodiments of the present disclosure are not limited thereto.

The above time domain resource may be any transmission unit in the time domain, which is not limited by the embodiments of the present disclosure. For example, the time domain resource may be a subframe, the time domain resource may also be a frame, the time domain resource may also be a slot, and the time domain resource may also be a time domain symbol.

It should be noted that in some cases, "time domain resources occupied by transmitting the PEI" above are resources actually occupied by transmitting the PEI. In other cases, "time domain resources occupied by transmitting the PEI" above may not be the resources actually occupied by transmitting the PEI, but may only be the resources related to the time domain resources occupied by transmitting the PEI. For example, when the above time domain resource are frames, the time domain resources occupied by transmitting the PEI may be understood as the frames occupied by transmitting the PEI, and the time domain resource actually occupied by transmitting the PEI may not occupy a starting position of the frames. At this time, if the first offset value is an offset value between the reference time domain resource and the starting position of the frames occupied by transmitting PEIs, the time domain resources occupied by transmitting the PEI are not actual time domain resources for really transmitting the PEI. Of course, when the above time domain resources are subframes or slots, a similar situation will occur.

The position of the reference time domain resource may be specified by the network device or may be predefined by protocol. Embodiments of the present disclosure are not limited thereto.

Figure 9:
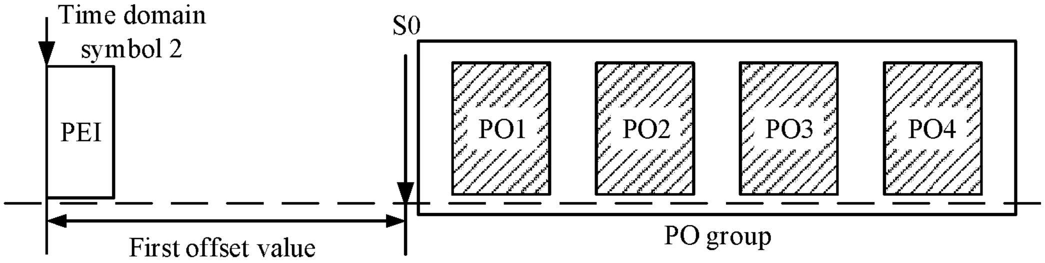
FIG. 9 illustrates a setting manner of a first offset value according to another embodiment of the present disclosure.

In combination with FIG. 9, a setting manner of the first offset value of the embodiments of the present disclosure is described by taking that a time domain resource occupied by transmitting the PEI is a starting time domain symbol for transmitting the PEI and the reference time domain resource is a starting time domain symbol occupied by the PO group as an example. Referring to FIG. 9, it is assumed that the PO group consists of four POs: PO1, PO2, PO3, and PO4. A starting time domain symbol occupied by the PO group is reference time domain symbol S0. The starting time domain symbol for transmitting the PEI is time domain symbol 2. Then, the first offset value is an offset value between reference time domain symbol S0 and time domain symbol 2. Optionally, the first offset value is equal to the number of time domain symbols between the reference time domain symbol S0 and the time domain symbol 2.

According to setting manner 6, the reference time domain resource is a time domain resource at Y/x position in time domain symbols occupied by the PO group. Accordingly, the first offset value is an offset value between the reference time domain resource and time domain resources occupied by transmitting the PEI.

Figure 10:
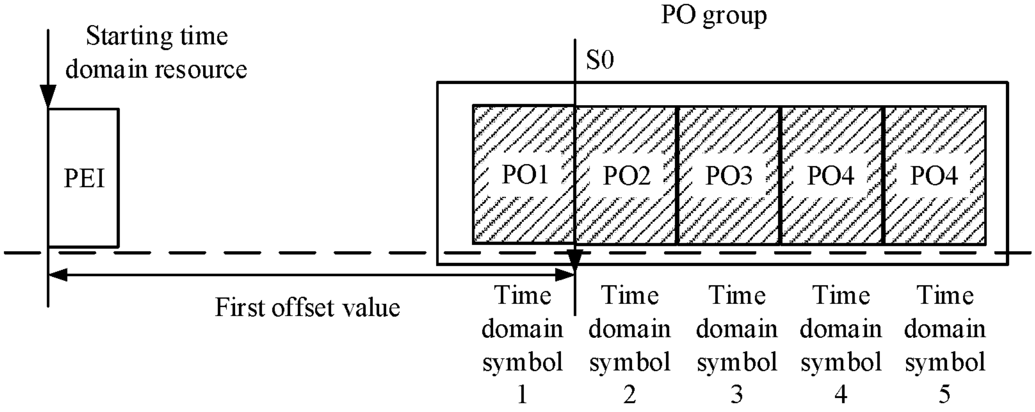
FIG. 10 illustrates a setting manner of a first offset value according to another embodiment of the present disclosure.

The above x represents the total number of time domain resources occupied by the PO group, and y is a positive integer less than or equal to x. For example, referring to FIG. 10, it is assumed that a time domain resource occupied by transmitting the PEI is a starting time domain resource in the time domain resources occupied by transmitting the PEI, the number of time domain symbols x occupied by the PO group is 5, and the value of y is 1. A starting time domain symbol in the time domain symbols occupied by the PO group is time domain symbol 1, a last time domain symbol in the time domain symbols occupied by the PO group is time domain symbol 5, and time domain symbols occupied by the PO group are numbered sequentially between the time domain symbol 1 and the time domain symbol 5. Then, the reference time domain resource is a time domain symbol at position ⅕ of the time domain symbols occupied by the PO group, that is, the reference time domain resource is at the ending position of time domain symbol 1.

The time domain resources occupied by transmitting the PEI may include a first time domain resource in the time domain resources occupied by transmitting the PEI. The time domain resource occupied by transmitting the PEI may be a last time domain resource in the time domain resources occupied by transmitting the PEI. Of course, the time domain resource occupied by transmitting the PEI may be any one of the time domain resources occupied by transmitting the PEI. Embodiments of the present disclosure are not limited thereto.

The time domain resource may be any type of transmission unit in the time domain, which is not limited by the embodiments of the present disclosure. For example, the time domain resource may be a subframe, or the time domain resource may be a frame, or the time domain resource may be a slot, and the time domain resource may also be a time domain symbol.

The position of the reference time domain resource may be specified by the network device or may be predefined by protocol. Embodiments of the present disclosure are not limited thereto.

The above first offset value may be specified by the network device or may be predefined by protocol. Embodiments of the present disclosure are not limited thereto. In addition, the time domain unit of the first offset value may be any time domain transmission unit, for example, a subframe, a time domain symbol, a slot, etc.

The relationship between the time domain resources occupied by the PO group and the first offset value is introduced above in combination with the setting manners 1 to 6 of the first offset value. Based on the above introduction, it can be seen that each PO group may correspond to one first offset value in the embodiments of the present disclosure. Accordingly, the terminal may receive the first PEI based on the length of the time domain resources occupied by transmitting the first PEI and the first PEI.

In other embodiments, a plurality of offset values may also be configured for each first PEI, where the plurality of offset values may include a starting offset value and an ending offset value, the starting offset value is a value between the reference time domain resource and a starting position of the time domain resources occupied by transmitting the PEI, and the ending offset value is an offset value between the reference time domain resource and an ending position of the time domain resources occupied by transmitting the PEI. Accordingly, the terminal may determine the resources occupied by transmitting the first PEI based on the starting offset value and the ending offset value.

Of course, in other embodiments, each PO group may also correspond to a plurality of first offset values to improve the reliability for the terminal receiving the first PEI. It is assumed that the first PO group may correspond to first offset value 1 and first offset value 2, where a time domain resource corresponding to the first offset value 1 is earlier than a time domain resource corresponding to the first offset value 2. Accordingly, the network device sends the first PEI on the time domain resource corresponding to the first offset value 1 and the first PEI on the time domain resource corresponding to the first offset value 2. Thus, the terminal may receive the first PEI on the time domain resource corresponding to the first offset value 1 and on the time domain resource corresponding to the first offset value 2, respectively, so as to avoid the terminal not receiving the first PEI on the time domain resource corresponding to the first offset value 1, which leads to the terminal being unable to determine whether it is waked up or not.

Of course, in the embodiments of the present disclosure, even if one PO group may correspond to a plurality of first offset values, the terminal may determine whether it is necessary to receive the first PEI on the time domain resources corresponding to the plurality of first offset values based on its own capability, PEI reception situation and other factors. In some cases, if the terminal has a stronger capability, the terminal may receive the first PEI only on a time domain resource corresponding to one of a plurality of first offset values. On the contrary, if the terminal has a weaker capability, the terminal may receive the first PEI on time domain resources corresponding to a plurality of first offset values. Of course, the embodiments of the present disclosure are not specifically limited to this. For a terminal with stronger capability, the terminal may also receive the first PEI on time domain resources corresponding to the plurality of first offset values. The terminal with weaker capability may also receive the first PEI only on a time domain resource corresponding to one first offset value.

As described above, the terminal also monitors paging indication information periodically on the POs according to the paging cycle (or DRX cycle). Therefore, in order to further improve the energy saving effect of the terminal, the network device may also send the first PEI periodically to indicate whether the terminal needs to receive the paging indication information on the POs. In some implementations, the first PEI may be configured with an independent transmission cycle for transmitting periodically. For example, the first PEI may be configured with a first cycle, and accordingly, the first PEI may be transmitted periodically with a cycle of the first cycle. In other implementations, the configured cycle may also be multiplexed to transmit the first PEI periodically. For example, a transmission cycle of the SSB burst set may be multiplexed to transmit the first PEI periodically. The following will be described in detail in combination with FIG. 13 to FIG. 15, and will not be repeated here for the sake of brevity.

In a scheme in which the first PEI is transmitted periodically according to a first cycle, the first PEI may be transmitted on a fixed time domain resource within the first cycle, so that the terminal can determine the first time domain resource occupied by transmitting the first PEI based only on the first cycle. For example, it is assumed that the first PEI is fixed for transmission on a first of time domain symbols of each cycle, accordingly, the terminal may determine the time domain resource occupied by transmitting the first PEI, i.e. a starting time domain symbol within the first cycle, based on a cycle length of the first cycle.

The first cycle may be predefined based on the protocol or may be pre-configured by the network device. In addition, a unit of the first cycle may be any kind of time domain unit, for example, a time domain symbol, a slot, a subframe, a frame, a millisecond, a second, etc.

Of course, in some cases, we want to improve the flexibility of the time domain resource occupied by the first PEI in the scenario where the first PEI is transmitted periodically. Accordingly, a second offset value may be set to indicate a position of the time domain resource occupied by the first PEI in each cycle, and accordingly, the time domain position of the time domain resource occupied by the first PEI in the first cycle is adjusted by adjusting the size of the second offset value.

In some implementations, the second offset value may be an offset value between a time domain resource occupied by transmitting the first PEI and a starting time domain resource in the first cycle. The second offset value may be an offset value between a time domain resource occupied by transmitting the first PEI and a last time domain resource in the first cycle. The second offset value may be understood as an offset value between a time domain resource occupied by transmitting the first PEI and any time domain resource in the first cycle. Embodiments of the present disclosure are not limited to the manner of determining the second offset value.

The time domain resources occupied by transmitting the PEI may include a first time domain resource in the time domain resources occupied by transmitting the PEI. The time domain resources occupied by transmitting the PEI may be a last time domain resource in the time domain resources occupied by transmitting the PEI. Of course, the time domain resources occupied by transmitting the PEI may be any one of the time domain resources occupied by transmitting the PEI. Embodiments of the present disclosure are not limited thereto.

The time domain resource may be any transmission unit in the time domain, which is not limited by the embodiments of the present disclosure. For example, the time domain resource may be a subframe, or the time domain resource may be a frame, or the time domain resource may be a slot, and the time domain resource may also be a time domain symbol.

The second offset value may be indicated to the terminal by the network device. Of course, the second offset value is also predefined by protocol, and the embodiments of the present disclosure are not limited thereto. In addition, the time domain unit of the second offset value may be any time domain transmission unit, for example, a subframe, a time domain symbol, a slot, etc.

A transmission manner of PEI according to the embodiments of the present disclosure is described below with reference to FIG. 11 and FIG. 12. It should be noted that the "first PEI" above may be understood as one PEI among a plurality of PEIs transmitted periodically below.

Figure 11:
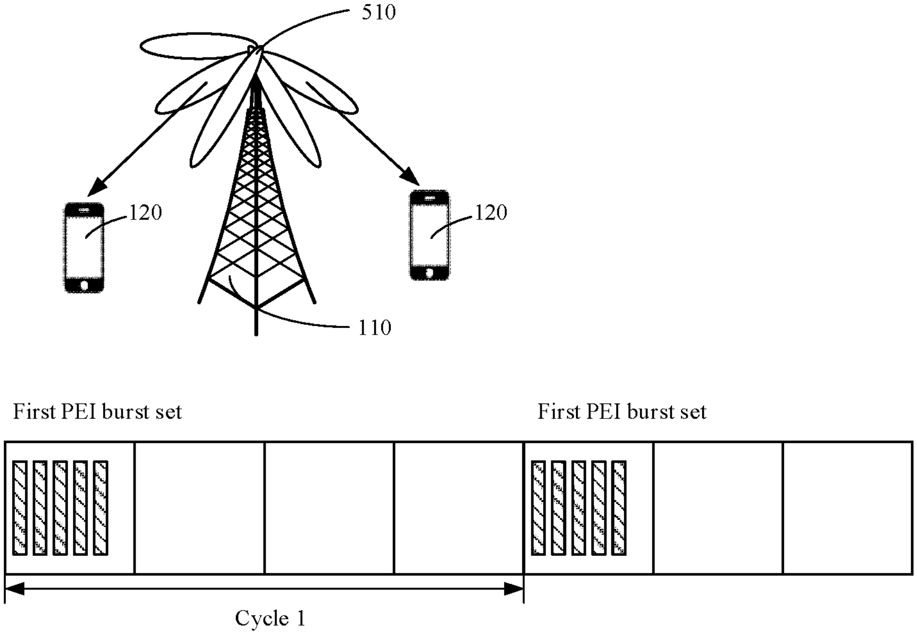
FIG. 11 illustrates a transmitting manner of a PEI according to an embodiment of the present disclosure.

Referring to FIG. 11, it is assumed that the network device 110 transmits the PEIs periodically with cycle 1 as the first cycle. During each cycle 1, the network device 110 transmits the PEIs to the terminal 120 in a beam scanning manner through 5 transmit beams 510. As mentioned above, the PEIs may also be called "PEI burst set" at this time.

Figure 12:
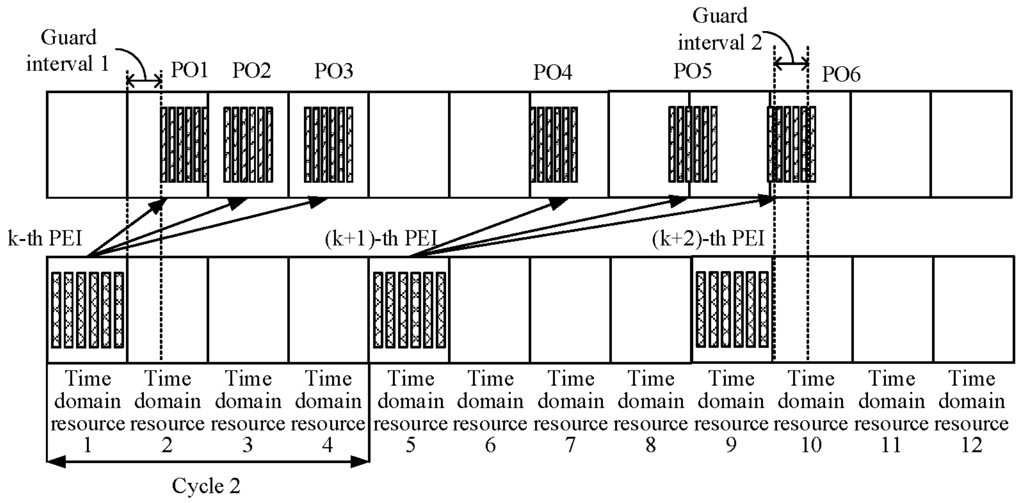
FIG. 12 illustrates a transmitting manner of a PEI according to another embodiment of the present disclosure.

Referring to FIG. 12, it is assumed that time domain resources 1 to 12 are arranged in sequence from early till late in the time domain. In addition, the network device configures the terminal to transmit PEIs periodically according to cycle 2. The network device will occupy a starting time domain resource of each cycle to transmit PEIs. At this time, time domain resource 1 occupied by a k-th PEI sent by the network device includes a starting time domain resource of a k-th cycle, time domain resource 5 occupied by a (k+1)-th PEI sent by the network device includes a starting time domain resource of a (k+1)-th cycle, and time domain resource 9 occupied by a (k+2)-th PEI sent by the network device includes a time domain resource symbol of a (k+2)-th cycle.

In addition, a time domain resource in which PO1 is located is time domain resource 2. A time domain resource in which PO2 is located is time domain resource 3. A time domain resource in which PO3 is located is time domain resource 4. A time domain resource in which PO4 is located is time domain resource 7. Time domain resources in which PO5 is located are time domain resource 8 and time domain resource 9. Time domain resources in which PO6 is located are time domain resource 6 and time domain resource 10. Moreover, PO1 only occupies a second half of time domain resource 2, and there is a guard interval 1 between a starting time domain resource occupied by PO1 and a last time domain resource occupied by the k-th PEI. PO6 occupies only a second half of the time domain resource 9, and there is no guard interval 2 between a starting time domain resource occupied by PO6 and a last time domain resource occupied by the (k+2)-th PEI.

In the above case, according to the scheme of PO group formed naturally described above, POs occupying time domain resources between the time domain resource 1 and the time domain resource 5 may form the PO group 1 naturally, and whether a paging indication message needs to be received on the POs within the PO group 1 is indicated by the k-th PEI. That is, PO Group 1 includes PO1, PO2, and PO3.

Since there is no guard interval 2 between the time domain resource occupied by PO6 and the time domain resource occupied by the (k+2)-th PEI, if the (k+2)-th PEI is used to indicate whether the terminal receives the paging indication message on PO6, the terminal may be processing the (k+2)-th PEI at this time, and it is too late to determine whether the paging indication message needs to be received on PO6. Therefore, in order to avoid the above situation, whether the terminal needs to receive the paging indication message on the PO6 may be indicated by the (k+1)-th PEI. At this time, whether the terminal needs to receive the paging indication message on PO4, PO5 and PO6 may be indicated by the (k+1)-th PEI, and accordingly, PO4, PO5 and PO6 form PO group 2 naturally.

As described above, a transmission cycle of the PEI may also be a transmission cycle of a multiplexed SSB burst set. However, in some cases, the transmission cycle of SSB burst set may be shorter, while PEI transmission does not need such a short transmission cycle. Therefore, the embodiments of the present disclosure also designs a parameter of "a transmission density for the PEI" to adjust a transmission frequency for the PEI. The transmission density for the PEI being N indicates that the PEI is transmitted once every N transmission cycles of the SSB burst set, and N is a positive integer.

Accordingly, the operation that the terminal determines the first time domain resource occupied by transmitting the first PEI may include that: the terminal determines the first time domain resource based on a transmission cycle of an SSB burst set, a third offset value and a transmission density for a PEI, where the third offset value is configured to determine a time domain resource position of the first time domain resource in the transmission cycle.

In some implementations, the third offset value may be an offset value between a target time domain resource and a starting time domain resource in the time domain resources occupied by transmitting the SSB burst set. The third offset value also may be an offset value between the target time domain resource and a last time domain resource in the time domain resources occupied by transmitting the SSB burst set. The third offset value also may be an offset value between the target time domain resource and any time domain resource in the time domain resources occupied by transmitting the SSB burst set.

The target time domain resource may be a starting time domain resource in the time domain resources occupied by transmitting the first PEI. The target time domain resource may also be a last time domain resource in the time domain resources occupied by transmitting the first PEI. The target time domain resource may also be any time domain resource in the time domain resources occupied by transmitting the first PEI.

In the embodiments of the present disclosure, a size of the time domain resources occupied by transmitting the first PEI may be a fixed value. That is, the size of the first time domain resource is may be a fixed value. In some implementations, the above fixed value may be predefined by protocol. In other implementations, the above fixed value may also configured by the network device.

Of course, the size of the first time domain resource may also be variable. At this time, a position of the time domain resource occupied by transmitting the PEI in the transmission cycle may be determined by two offset values. That is, an offset value between the starting time domain resource of the first time domain resource and the time domain resource occupied by the transmitting the SSB burst set is indicated by the offset value 1, and an offset value between the last time domain resource in the first time domain resource and the time domain resource occupied by transmitting the SSB burst set is indicated by the offset value 2. A time domain resource occupied by transmitting the SSB burst set may be a starting time domain resource occupied by transmitting the SSB burst set. A time domain resource occupied by transmitting the SSB burst set may be a last time domain resource occupied by transmitting the SSB burst set. A time domain resource occupied by transmitting the SSB burst set may be any time domain resource occupied by transmitting the SSB burst set.

The above third offset value may be specified by the network device or may be predefined by protocol. Embodiments of the present disclosure are not limited thereto. In addition, the time domain unit of the third offset value may be any time domain transmission unit, for example, a subframe, a time domain symbol, a slot, etc.

A transmission manner of PEI according to the embodiments of the present disclosure is described below with reference to FIG. 13 to FIG. 15. It should be noted that the third offset value in the schemes of FIG. 13 to FIG. 15 is an offset value between the starting time domain resource of the time domain resources occupied by transmitting the PEI and a last time domain resource of the time domain resources occupied by transmitting the SSB burst set.

Figure 13:
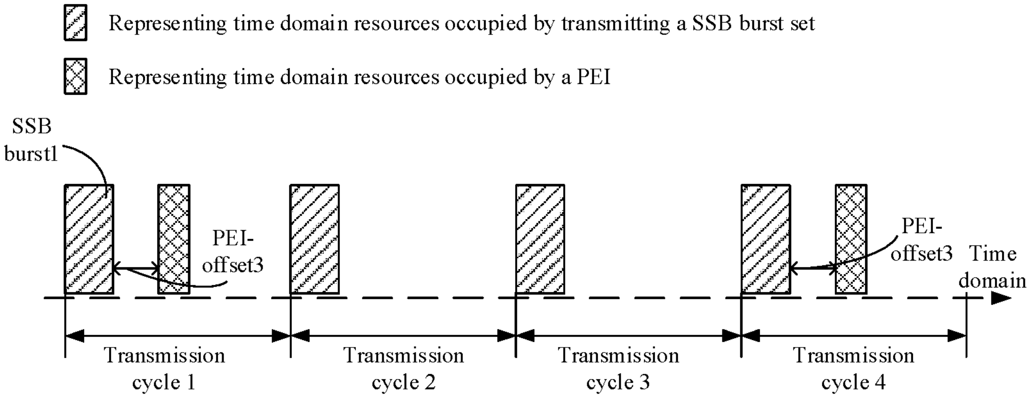
FIG. 13 illustrates a transmitting manner of a PEI according to another embodiment of the present disclosure.

Referring to FIG. 13, it is assumed that there are 4 transmission cycles of SSB burst sets, namely transmission cycle 1, transmission cycle 2, transmission cycle 3 and transmission cycle 4. The third offset value is PEI-offset3. The transmission density for the PEI N is 3, that is, PEI is transmitted once every 3 transmission cycles of SSB burst sets. In addition, an identity of the first SSB burst set associated with the first PEI is SSB burst 1.

Then, the time domain resources for transmitting PEI are located in transmission cycle 1 and transmission cycle 4, respectively. In transmission cycle 1, the offset value between the starting time domain resource of the time domain resources occupied by transmitting the PEI and the last time domain resource of the time domain resources occupied by transmitting the SSB burst set is PEI-offset 3. In transmission cycle 4, the offset value between the starting time domain resource of the time domain resources occupied by transmitting the PEI and the last time domain resource of the time domain resources occupied by transmitting the SSB burst set is PEI-offset 3.

Figure 14:
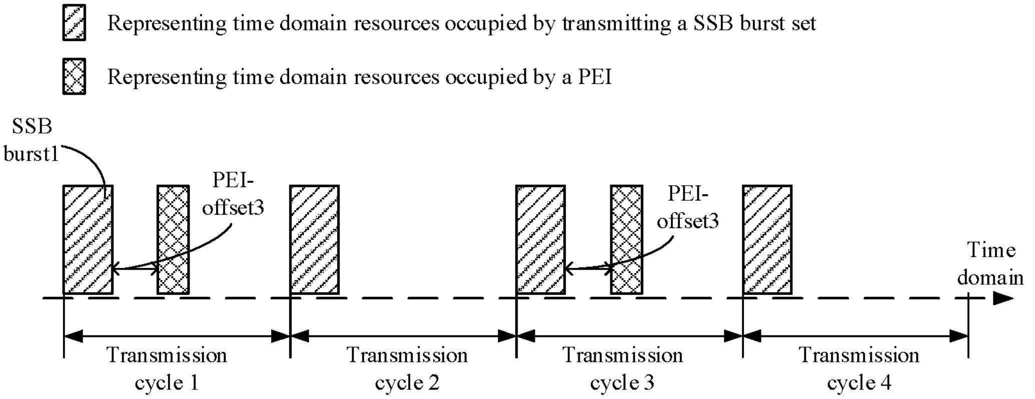
FIG. 14 illustrates a transmitting manner of a PEI according to another embodiment of the present disclosure.
Figure 15:
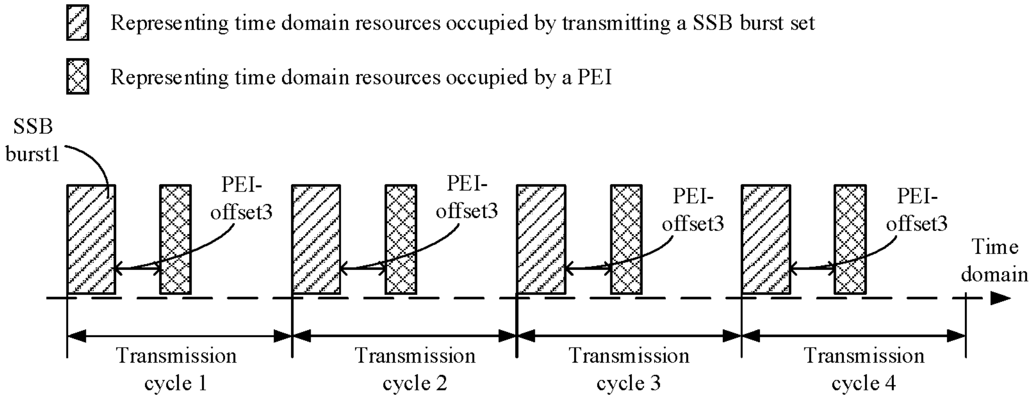
FIG. 15 illustrates a transmitting manner of a PEI according to another embodiment of the present disclosure.

Referring to FIG. 14, it is assumed that there are 4 transmission cycles of SSB burst sets, namely transmission cycle 1, transmission cycle 2, transmission cycle 3 and transmission cycle 4. The third offset value is PEI-offset3. The transmission density for the PEI N is 2, that is, PEI is transmitted once every 2 transmission cycles of SSB burst set. In addition, an identity of the first SSB burst set associated with the first PEI is SSB burst 1.

Then, the time domain resources for transmitting PEI are located in transmission cycle 1 and transmission cycle 3, respectively. In transmission cycle 1, the offset value between the starting time domain resource of the time domain resources occupied by transmitting the PEI and the last time domain resource of the time domain resources occupied by transmitting the SSB burst set is PEI-offset 3. In transmission cycle 3, the offset value between the starting time domain resource of the time domain resources occupied by transmitting the PEI and the last time domain resource of the time domain resources occupied by transmitting the SSB burst set is PEI-offset 3.

Referring to FIG. 15, it is assumed that there are 4 transmission cycles of SSB burst sets, namely transmission cycle 1, transmission cycle 2, transmission cycle 3 and transmission cycle 4. The third offset value is PEI-offset3. The transmission density for the PEI N is 1, that is, PEI is transmitted once every 1 transmission cycle of SSB burst set. In addition, an identity of the first SSB burst set associated with the first PEI is SSB burst 1.

Then, the time domain resources for transmitting PEI are respectively located in transmission cycle 1, transmission cycle 2, transmission cycle 3 and transmission cycle 4, and in each transmission cycle, the offset value between the starting time domain resource of the time domain resources occupied by transmitting the PEI and the last time domain resource of the time domain resources occupied by transmitting the SSB burst set is PEI-offset 3.

As mentioned above, an index of the SSB burst set associated with the PEI needs to be determined first when determining a position within the time domain resources occupied by transmitting the PEI. The embodiments of the present disclosure also provides a manner for determining an index of the SSB burst set associated with the PEI. That is, a Y-th SSB burst set of each X SSB burst sets may be determined to be an SSB burst set associated with the PEI by the formula mod (M, X)=Y, where X and Y represent positive integers.

It should be noted that the values of X and Y may be configured by the network or fixed values predefined by protocol.

A method for transmitting PEIs periodically according to an embodiment of the present disclosure has been described above in connection with FIG. 11-FIG. 15, of course, the PEI may also be transmitted according to a transmission pattern, where the transmission pattern is used to indicate a length of time between each two transmissions of the PEI. Embodiments of the present disclosure do not specifically limit the transmission manner of PEIs.

In another example of the present disclosure, the time domain resources occupied by transmitting the PEI may also be determined directly based on an association relationship between a PEI and an index of the SSB burst set. That is, the operation that the terminal determines the first time domain resource occupied by transmitting the first PEI includes that: the terminal determines an index of a first SSB burst set associated with the first PEI based on an association relationship between a PEI and an index of a SSB burst set; and the terminal determines the first time domain resource based on time domain resources for transmitting the first SSB burst set and a positional relationship between time domain resources occupied by transmitting the SSB burst sets and time domain resources occupied by transmitting the PEIs.

The association relationship between the PEI and the index of SSB burst set may be expressed by a formula. For example, a Y-th SSB burst set of each X SSB burst sets is determined to be the SSB burst set associated with the PEI by the formula mod (M, X)=Y, where X and Y represent positive integers. The association relationship between the PEI and the index of the SSB burst set may also be represented by an index pattern of the SSB burst set. For example, the SSB burst set index is denoted as {SSB1, SSB2, SSB3, SSB4, SSB5, SSB6}, and the index pattern of the SSB burst set is denoted as {1, 0, 0, 0, 1, 0}, where 1 denotes the SSB burst set index is associated with the PEI at a position corresponding to a pattern, and 0 denotes that the SSB burst set index at a position corresponding to a pattern does not need to be associated with PEI. Then, based on the index pattern of the SSB burst set, SSB burst set indexes SSB1 and SSB5 are associated with the PEI.

The method embodiments of the present disclosure have been described in detail above with reference to FIG. 1 to FIG. 15, and the apparatus embodiments of the present disclosure have been described in detail below with reference to FIG. 16 to FIG. 18. It should be understood that the description of the method embodiment and the description of the apparatus embodiment correspond to each other and therefore portions not described in detail may be referred to the preceding method embodiment.

Figure 16:
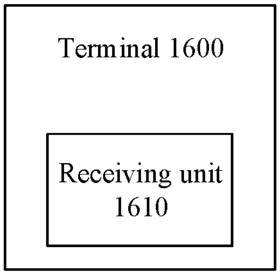
FIG. 16 illustrates a schematic diagram of a terminal according to an embodiment of the present disclosure.

FIG. 16 illustrates a schematic diagram of a terminal according to an embodiment of the present disclosure. The terminal 1600 illustrated in FIG. 16 includes a receiving unit 1610.

The receiving unit 1610 is configured to receive a first paging early indication (PEI) from a network device, the first PEI being configured to indicate whether the terminal receives paging indication information on a first paging occasion (PO) in a first PO group.

Optionally, in some implementations, the terminal further includes: a processing unit, configured to determine a first time domain resource occupied by transmitting the first PEI; the receiving unit is configured to receive the first PEI from the network device on the first time domain resource.

Optionally, in some implementations, the processing unit is configured to determine the first time domain resource based on time domain resources occupied by the first PO group and a positional relationship between time domain resources occupied by PO groups and time domain resources occupied by transmitting PEIs.

Optionally, in some implementations, the positional relationship between the time domain resources occupied by the PO groups and the time domain resources occupied by transmitting the PEIs is determined by a first offset value, and a reference time domain resource is configured to indicate time domain resources occupied by a PO group, herein the first offset value is an offset value between the reference time domain resource and a starting time domain resource in the time domain resources occupied by transmitting a PEI; or the first offset value is an offset value between the reference time domain resource and a last time domain resource in the time domain resources occupied by transmitting the PEI; or the first offset value is an offset value between the reference time domain resource and any one of the time domain resources occupied by transmitting the PEI.

Optionally, in some implementations, the reference time domain resource is any one of the following time domain resources: a starting time domain symbol in time domain symbols in which any PO in the PO group is located; a starting position of a slot in which any PO in the PO group is located; a starting position of a subframe in which any PO in the PO group is located; a starting position of a frame in which any PO in the PO group is located; a starting time domain resource in the time domain resources occupied by the PO group; and a time domain resource at y/x of the time domain resources occupied by the PO group, herein x represents a total number of time domain resources occupied by the PO group, and y is a positive integer less than or equal to x.

Optionally, in some implementations, the first PEI is one of a plurality of PEIs, the plurality of PEIs are transmitted periodically in a first cycle, the processing unit is configured to determine the first time domain resource occupied by transmitting the first PEI based on the first cycle.

Optionally, in some implementations, the processing unit is configured to determine the first time domain resource based on the first cycle and a second offset value, herein the second offset value is configured to determine a time domain resource position of the first time domain resource in the first cycle.

Optionally, in some implementations, the first PEI is one of a plurality of PEIs, the plurality of PEIs are transmitted periodically, the processing unit is configured to determine the first time domain resource based on a transmission cycle of an SSB burst set, a third offset value and a transmission density for a PEI, herein the third offset value is configured to determine a time domain resource position of the first time domain resource in the transmission cycle, the transmission density for the PEI being N indicates that the PEI is transmitted once every N transmission cycles of the SSB burst set, and N is a positive integer.

Optionally, in some implementations, the processing unit is configured to determine an index of a first SSB burst set associated with the first PEI based on an association relationship between a PEI and an index of a SSB burst set; and determine the first time domain resource based on a time domain resource for transmitting the first SSB burst set and a positional relationship between time domain resources occupied by transmitting SSB burst sets and time domain resources occupied by transmitting PEIs.

Optionally, in some implementations, the first PO group includes part or all of POs within a first paging frame (PF) in which the first PO is located; or the first PO group includes part or all of POs within a transmission cycle of a first SSB burst set in which the first PO is located; or the first PO group includes part or all of POs within a first paging cycle in which the first PO is located; or the first PO group includes part or all of POs within a first discontinuous reception (DRX) cycle in which the first PO is located.

Optionally, in some implementations, a number of PFs in which a PO in the first PO group is located is M, and M is a positive integer; or a number of SSB burst sets in which the PO in the first PO group is located is P, where P is a positive integer; or a number of paging cycles in which the PO in the first PO group is located is Q, herein Q is a positive integer; or a number of DRX cycles in which the PO in the first PO group is located is K, herein K is a positive integer.

Optionally, in some implementations, a terminal corresponding to a PO in the first PO group performs time-frequency synchronization and/or automatic generation control (AGC) based on a same SSB burst set.

Optionally, in some implementations, the first PO group is one of a plurality of PO groups, and different PO groups in the plurality of PO groups include a same number of POs.

Optionally, in some implementations, a PO located within a target time domain resource belongs to the first PO group, the target time domain resource is a time domain resource region between a second time domain resource corresponding to the first PEI and a third time domain resource corresponding to a second PEI, and the second PEI is a next PEI, sent after the first PEI, among a plurality of PEIs.

Optionally, in some implementations, the second time domain resource corresponding to the first PEI is a last time domain unit in a first guard interval, and the first guard interval is a guard interval located after a time domain resource occupied by transmitting the first PEI, and/or the third time domain resource corresponding to the second PEI is a last time domain unit in a second guard interval, and the second guard interval is a guard interval located after a time domain resource occupied by transmitting the second PEI.

Optionally, in some implementations, the first PO group includes one or more POs.

Figure 17:
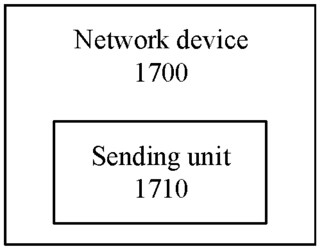
FIG. 17 is a schematic diagram of a network device according to an embodiment of the present disclosure.

FIG. 17 is a schematic diagram of a network device according to an embodiment of the present disclosure. As illustrated in FIG. 18, the network device 1700 includes a sending unit 1710.

The sending unit 1710 is configured to send a first paging early indication (PEI) to a terminal, the first PEI being configured to indicate whether the terminal receives paging indication information on a first paging occasion (PO) in a PO group.

Optionally, in some implementations, the network device further includes: a processing unit, configured to determine a first time domain resource occupied by transmitting the first PEI; the sending unit is further configured to send the first PEI to the terminal on the first time domain resource.

Optionally, in some implementations, the processing unit is configured to determine the first time domain resource based on time domain resources occupied by the first PO group and a positional relationship between time domain resources occupied by PO groups and time domain resources occupied by transmitting PEIs.

Optionally, in some implementations, the positional relationship between the time domain resources occupied by the PO groups and the time domain resources occupied by transmitting the PEIs is determined by a first offset value, and a reference time domain resource is configured to indicate the time domain resources occupied by the PO group, herein the first offset value is an offset value between the reference time domain resource and a starting time domain resource in time domain resources occupied by transmitting a PEI; or the first offset value is an offset value between the reference time domain resource and a last time domain resource in the time domain resources occupied by transmitting the PEI; or the first offset value is an offset value between the reference time domain resource and any one of the time domain resources occupied by transmitting the PEI.

Optionally, in some implementations, the reference time domain resource is any one of the following time domain resources: a starting time domain symbol in time domain symbols in which any PO in the PO group is located; a starting position of a slot in which any PO in the PO group is located; a starting position of a subframe in which any PO in the PO group is located; a starting position of a frame in which any PO in the PO group is located; a starting time domain resource in the time domain resources of the PO group; and a time domain resource at y/x of the time domain resources occupied by the PO group, herein x represents a total number of time domain resources occupied by the PO group, and y is a positive integer less than or equal to x.

Optionally, in some implementations, the first PEI is one of a plurality of PEIs, the plurality of PEIs are transmitted periodically in a first cycle, the processing unit is configured to determine the first time domain resource occupied by transmitting the first PEI based on the first cycle.

Optionally, in some implementations, the processing unit is configured to determine the first time domain resource based on the first cycle and a second offset value, herein the second offset value is configured to determine a time domain resource position of the first time domain resource in the first cycle.

Optionally, in some implementations, the first PEI is one of a plurality of PEIs, the plurality of PEIs are transmitted periodically, the processing unit is configured to determine the first time domain resource based on a transmission cycle of an SSB burst set, a third offset value and a transmission density for a PEI, herein the third offset value is configured to determine a time domain resource position of the first time domain resource in the transmission cycle, the transmission density for the PEI being N indicates that the PEI is transmitted once every N transmission cycles of the SSB burst set, and N is a positive integer.

Optionally, in some implementations, the first PO group includes part or all of POs within a first paging frame (PF) in which the first PO is located; or the first PO group includes part or all of POs within a transmission cycle of a first SSB burst set in which the first PO is located; or the first PO group includes part or all of POs within a first paging cycle in which the first PO is located; or the first PO group includes part or all of POs within a first discontinuous reception (DRX) cycle in which the first PO is located.

Optionally, in some implementations, a number of PFs in which a PO in the first PO group is located is M, and M is a positive integer; or a number of SSB burst sets in which the PO in the first PO group is located is P, where P is a positive integer; or a number of paging cycles in which the PO in the first PO group is located is Q, herein Q is a positive integer; or a number of DRX cycles in which the PO in the first PO group is located is K, herein K is a positive integer.

Optionally, in some implementations, a terminal corresponding to a PO in the first PO group performs time-frequency synchronization and/or automatic generation control (AGC) based on a same SSB burst set.

Optionally, in some implementations, the first PO group is one of a plurality of PO groups, and different PO groups in the plurality of PO groups include a same number of POs.

Optionally, in some implementations, a PO located within a target time domain resource belongs to the first PO group, the target time domain resource is a time domain resource region between a second time domain resource corresponding to the first PEI and a third time domain resource corresponding to a second PEI, and the second PEI is a next PEI, sent after the first PEI, among a plurality of PEIs.

Optionally, in some implementations, the second time domain resource corresponding to the first PEI is a last time domain unit in a first guard interval, and the first guard interval is a guard interval located after a time domain resource occupied by transmitting the first PEI, and/or the third time domain resource corresponding to the second PEI is a last time domain unit in a second guard interval, and the second guard interval is a guard interval located after a time domain resource occupied by transmitting the second PEI.

Optionally, in some implementations, the first PO group includes one or more POs.

Figure 18:
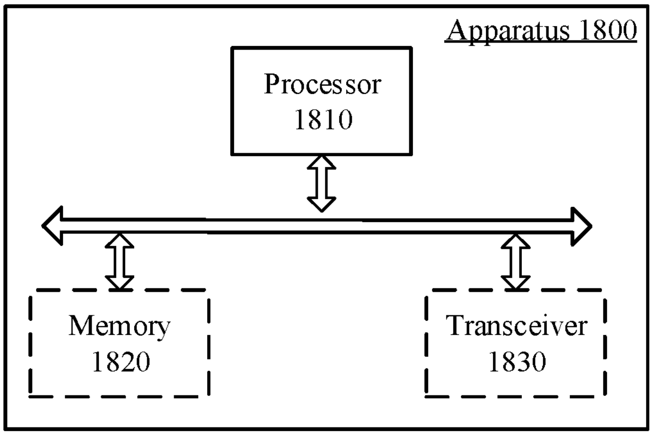
FIG. 18 is a schematic diagram of a structure of a communication apparatus according to an embodiment of the present disclosure.

FIG. 18 is a schematic diagram of a structure of a communication apparatus according to an embodiment of the present disclosure. The dotted line in FIG. 18 indicates that the unit or module is optional. The apparatus 1800 may be used to implement the methods described in the above method embodiments. The apparatus 1800 may be a chip, a terminal device or a network device.

The apparatus 1800 may include one or more processors 1810. The processor 1810 may support the apparatus 1800 to implement the methods described previously in the method embodiments. The processor 1810 may be a general purpose processor or a special-purpose processor. For example, the processor may be a central processing unit (CPU). Optionally, the processor may be a general purpose processor, a digital signal processor (DSP), an application specific integrated circuit (ASIC), a field programmable gate array (FPGA) or other programmable logic devices, discrete gates or transistor logic devices, or discrete hardware components. The general purpose processor may be a microprocessor or any conventional processor.

The apparatus 1800 may further include one or more memories 1820. The memory 1820 stores a program that may be executed by processor 1810 such that processor 1810 performs the methods described previously in the method embodiments. The memory 1820 may be independent of the processor 1810 or may be integrated within the processor 1810.

The apparatus 1800 may also include a transceiver 1830. The processor 1810 may communicate with other device or chips through the transceiver 1830. For example, the processor 1810 may transmit and receive data with other device or chips via the transceiver 1830.

In an embodiment of the present disclosure, there is further provided a computer-readable storage medium, configured to store a program. The computer-readable storage medium may be applied to the terminal or the network device provided by the embodiments of the present disclosure, and the program causes a computer to perform the method implemented by the terminal or the network device in each embodiments of the present disclosure.

In an embodiment of the present disclosure, there is further provided a computer program product. The computer program product includes a computer. The computer program product may be applied to the terminal or the network device provided by the embodiments of the present disclosure, and the program causes a computer to perform the method implemented by the terminal or the network device in each embodiments of the present disclosure.

In an embodiment of the present disclosure, there is further provided a computer program. The computer program may be applied to the terminal or the network device provided by the embodiments of the present disclosure, and the computer program causes a computer to perform the method implemented by the terminal or the network device in each embodiments of the present disclosure.

It should be understood that the terms “system” and “network” in the present disclosure may be used interchangeably. In addition, Terms used in the present disclosure are used only for explanation of specific embodiments of the present disclosure and are not intended to be limiting. Terms “first”, “second”, “third”, “fourth”, etc. in the description and claims of the present disclosure and the above drawings are used to distinguish different objects, and are not used to describe a particular order. Furthermore, the terms “including” and “having” and any variations thereof are intended to cover non-exclusive inclusion.

The reference to “indicate” in the embodiments of the present disclosure may be a direct indication, may be an indirect indication, or may indicate an association relationship. For example, A indicates B, which may mean that A directly indicates B, for example, B may be obtained through A. It may also mean that A indirectly indicates B, for example, A indicates C, and B may be obtained by C. It may also indicate that there is an association relationship between A and B.

In the embodiments of the present disclosure, “B corresponding to A” means that B is associated with A, and B may be determined based on A. It should also be understood, however, that determining B based on A does not mean determining B based on A alone, but may also be determined based on A and/or other information.

In the embodiments of the present disclosure, the term “correspond” may mean that there is a direct correspondence or an indirect correspondence relationship between the two, may also mean that there is an association relationship between the two, may also be a relationship between indication and being indicated, configuration and being configured, etc.

In embodiments of the present disclosure, the “predefined” or “pre-configured” may be implemented by prestoring corresponding codes, tables, or other manners that may be used to indicate relevant information in devices (e.g., including terminal devices and network devices), the specific implementation of which is not limited by the present disclosure. For example, predefined may refer to what is defined in the protocol.

In embodiments of the present disclosure, the “protocol” may refer to standard protocols in the communication field, such as LTE protocol, NR protocol, and related protocols applied in future communication systems, which are not limited herein.

In the embodiments of the present disclosure, the term “and/or” is used to describe an association relationship of associated objects, and represents that there may be three relationships. For example, A and/or B may represent the following three situations: i.e., independent existence of A, existence of both A and B and independent existence of B. In addition, the character “/” in the present disclosure generally represents that an “or” relationship is formed between the previous and next associated objects.

In various embodiments of the present disclosure, the size of the sequence number of the above processes does not mean the order of execution, and the execution order of each process should be determined by its function and inherent logic, and should not be limited in any way to the implementation process of the embodiments of the present disclosure.

In several embodiments provided herein, it should be understood that the disclosed systems, apparatuses and methods may be implemented in other manners. For example, the above-described embodiments of the apparatus is only schematic, for example, the division of the units is only a logical function division, and in practice, there may be another division manner, for example, multiple units or components may be combined or integrated into another system, or some features may be ignored or not performed. On the other hand, the coupling or direct coupling or communication connection between each other illustrated or discussed may be indirect coupling or communication connection through some interfaces, devices or units, and may be electrical, mechanical or other form.

The units illustrated as separate elements may or may not be physically separated, and the elements displayed as units may or may not be physical units, i.e. may be located in a place, or may be distributed over a plurality of network units. Part or all of the units may be selected according to the actual needs to achieve the purpose of the embodiments of the present disclosure.

In addition, each functional unit in each embodiment of the present disclosure may be integrated in one processing unit, each unit may exist physically alone, or two or more units may be integrated in one unit.

In the above-described embodiments, it may be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, the flow or function described in accordance with embodiments of the present disclosure is generated in whole or in part. The computer may be a general purpose computer, a special purpose computer, a computer network, or other programmable device. The computer instructions may be stored in a computer-readable storage medium, or from one computer-readable storage medium to another. For example, the computer instructions may be transmitted from a web site, computer, server, or data center to another web site, computer, server, or data center via wired (e.g. coaxial cable, optical fiber, digital subscriber line (DSL)) or wireless (e.g. infrared, wireless, microwave, etc.). The computer-readable storage medium may be any usable medium that a computer may read or a data storage device containing one or more usable media integration, such as a server, data center, etc. The usable media may be magnetic media (e.g. floppy disk, hard disk, magnetic tape), optical media (e.g. digital video disc (DVD)), or semiconductor media (e.g. solid state disk (SSD)), etc.

The above is only the specific implementation of the present disclosure, but the scope of protection of the present disclosure is not limited thereto. Any person skilled in the art may easily think of changes or substitutions within the technical scope disclosed in the present disclosure, which should be covered within the protection scope of the present disclosure. Therefore, the scope of protection of the present disclosure shall be subject to the scope of protection of the claims.

The invention claimed is:

1. A method for transmitting a paging early indication (PEI), comprising:

determining, by a terminal, a first time domain resource occupied by transmitting a first PEI; and receiving, by the terminal, the first PEI from a network device on the first time domain resource, the first PEI being configured to indicate whether the terminal receives paging indication information on a first paging occasion (PO) in a first PO group, wherein determining, by the terminal, the first time domain resource occupied by transmitting the first PEI comprises:

determining, by the terminal, the first time domain resource based on time domain resources occupied by the first PO group and a positional relationship between time domain resources occupied by PO groups and time domain resources occupied by transmitting PEIs;

wherein the positional relationship between the time domain resources occupied by the PO groups and the time domain resources occupied by transmitting the PEIs is determined by a first offset value, and a reference time domain resource is configured to indicate time domain resources occupied by a PO group, wherein the first offset value is an offset value between the reference time domain resource and a starting time domain resource in time domain resources occupied by transmitting a PEI; or the first offset value is an offset value between the reference time domain resource and a last time domain resource in the time domain resources occupied by transmitting the PEI; or the first offset value is an offset value between the reference time domain resource and any one of the time domain resources occupied by transmitting the PEI.

2. The method of claim 1, wherein the reference time domain resource is any one of the following time domain resources:

a starting time domain symbol in time domain symbols in which any PO in the PO group is located;

a starting position of a slot in which any PO in the PO group is located;

a starting position of a subframe in which any PO in the PO group is located;

a starting position of a frame in which any PO in the PO group is located;

a starting time domain resource in the time domain resources occupied by the PO group; and a time domain resource at y/x of the time domain resources occupied by the PO group, wherein x represents a total number of time domain resources occupied by the PO group, and y is a positive integer less than or equal to x.

3. The method of claim 1, wherein the first PO group comprises part or all of POs within a first paging frame (PF) in which the first PO is located; or the first PO group comprises part or all of POs within a transmission cycle of a first SSB burst set in which the first PO is located; or the first PO group comprises part or all of POs within a first paging cycle in which the first PO is located; or the first PO group comprises part or all of POs within a first discontinuous reception (DRX) cycle in which the first PO is located.

4. The method of claim 1, wherein a number of PFs in which a PO in the first PO group is located is M, and M is a positive integer; or a number of SSB burst sets in which the PO in the first PO group is located is P, and P is a positive integer; or a number of paging cycles in which the PO in the first PO group is located is Q, and Q is a positive integer; or a number of DRX cycles in which the PO in the first PO group is located is K, and K is a positive integer.

5. The method of claim 1, wherein the first PO group comprises one or more POs.

6. A method for transmitting a paging early indication (PEI), comprising:

determining, by a network device, a first time domain resource occupied by transmitting a first PEI; and sending, by the network device, the first PEI to a terminal on the first time domain resource, the first PEI being configured to indicate whether the terminal receives paging indication information on a first paging occasion (PO) in a first PO group, wherein determining, by the network device, the first time domain resource occupied by transmitting the first PEI comprises:

determining, by the network device, the first time domain resource based on time domain resources occupied by the first PO group and a positional relationship between time domain resources occupied by PO groups and time domain resources occupied by transmitting PEIs;

wherein the positional relationship between the time domain resources occupied by the PO groups and the time domain resources occupied by transmitting the PEIs is determined by a first offset value, and a reference time domain resource is configured to indicate time domain resources occupied by a PO group, wherein the first offset value is an offset value between the reference time domain resource and a starting time domain resource in time domain resources occupied by transmitting a PEI; or the first offset value is an offset value between the reference time domain resource and a last time domain resource in the time domain resources occupied by transmitting the PEI; or the first offset value is an offset value between the reference time domain resource and any one of the time domain resources occupied by transmitting the PEI.

7. The method of claim 6, wherein the reference time domain resource is any one of the following time domain resources:

a starting time domain symbol in time domain symbols in which any PO in the PO group is located;

a starting position of a slot in which any PO in the PO group is located;

a starting position of a subframe in which any PO in the PO group is located;

a starting position of a frame in which any PO in the PO group is located;

a starting time domain resource in the time domain resources occupied by the PO group; and a time domain resource at y/x of the time domain resources occupied by the PO group, wherein x represents a total number of time domain resources occupied by the PO group, and y is a positive integer less than or equal to x.

8. The method of claim 6, wherein the first PO group comprises part or all of POs within a first paging frame (PF) in which the first PO is located; or the first PO group comprises part or all of POs within a transmission cycle of a first SSB burst set in which the first PO is located; or the first PO group comprises part or all of POs within a first paging cycle in which the first PO is located; or the first PO group comprises part or all of POs within a first discontinuous reception (DRX) cycle in which the first PO is located.

9. The method of claim 6, wherein a number of PFs in which a PO in the first PO group is located is M, and M is a positive integer; or a number of SSB burst sets in which the PO in the first PO group is located is P, and P is a positive integer; or a number of paging cycles in which the PO in the first PO group is located is Q, and Q is a positive integer; or a number of DRX cycles in which the PO in the first PO group is located is K, and K is a positive integer.

10. The method of claim 6, wherein the first PO group comprises one or more POs.

11. A terminal, comprising: a memory, a processor and a communication interface, wherein the memory is configured to store a program, and the processor is configured to call the program in the memory to cause the terminal to:

determine a first time domain resource occupied by transmitting a first paging early indication (PEI); and receive the first PEI from a network device on the first time domain resource, the first PEI being configured to indicate whether the terminal receives paging indication information on a first paging occasion (PO) in a first PO group, wherein the processor is configured to cause the terminal to determine the first time domain resource based on time domain resources occupied by the first PO group and a positional relationship between time domain resources occupied by PO groups and time domain resources occupied by transmitting PEIs;

wherein the positional relationship between the time domain resources occupied by the PO groups and the time domain resources occupied by transmitting the PEIs is determined by a first offset value, and a reference time domain resource is configured to indicate time domain resources occupied by a PO group, wherein the first offset value is an offset value between the reference time domain resource and a starting time domain resource in time domain resources occupied by transmitting a PEI; or the first offset value is an offset value between the reference time domain resource and a last time domain resource in the time domain resources occupied by transmitting the PEI; or the first offset value is an offset value between the reference time domain resource and any one of the time domain resources occupied by transmitting the PEI.

12. The terminal of claim 11, wherein the reference time domain resource is any one of the following time domain resources:

a starting time domain symbol in time domain symbols in which any PO in the PO group is located;

a starting position of a slot in which any PO in the PO group is located;

a starting position of a subframe in which any PO in the PO group is located;

a starting position of a frame in which any PO in the PO group is located;

a starting time domain resource in the time domain resources occupied by the PO group; and a time domain resource at y/x of the time domain resources occupied by the PO group, wherein x represents a total number of time domain resources occupied by the PO group, and y is a positive integer less than or equal to x.

13. The terminal of claim 11, wherein the first PO group comprises part or all of POs within a first paging frame (PF) in which the first PO is located; or the first PO group comprises part or all of POs within a transmission cycle of a first SSB burst set in which the first PO is located; or the first PO group comprises part or all of POs within a first paging cycle in which the first PO is located; or the first PO group comprises part or all of POs within a first discontinuous reception (DRX) cycle in which the first PO is located.

14. The terminal of claim 11, wherein a number of PFs in which a PO in the first PO group is located is M, and M is a positive integer; or a number of SSB burst sets in which the PO in the first PO group is located is P, and P is a positive integer; or a number of paging cycles in which the PO in the first PO group is located is Q, and Q is a positive integer; or a number of DRX cycles in which the PO in the first PO group is located is K, and K is a positive integer.

15. The terminal of claim 11, wherein the first PO group comprises one or more POs.

16. A network device, comprising: a memory, a processor and a communication interface, wherein the memory is configured to store a program, and the processor is configured to call the program in the memory to cause the network device to:

determine a first time domain resource occupied by transmitting a first paging early indication (PEI); and send the first PEI to a terminal on the first time domain resource, the first PEI being configured to indicate whether the terminal receives paging indication information on a first paging occasion (PO) in a PO group, wherein the processor is configured to cause the network device to determine the first time domain resource based on time domain resources occupied by the first PO group and a positional relationship between time domain resources occupied by PO groups and time domain resources occupied by transmitting PEIs;

wherein the positional relationship between the time domain resources occupied by the PO groups and the time domain resources occupied by transmitting the PEIs is determined by a first offset value, and a reference time domain resource is configured to indicate time domain resources occupied by a PO group, wherein the first offset value is an offset value between the reference time domain resource and a starting time domain resource in time domain resources occupied by transmitting a PEI; or the first offset value is an offset value between the reference time domain resource and a last time domain resource in the time domain resources occupied by transmitting the PEI; or the first offset value is an offset value between the reference time domain resource and any one of the time domain resources occupied by transmitting the PEI.

17. The network device of claim 16, wherein the reference time domain resource is any one of the following time domain resources:

a starting time domain symbol in time domain symbols in which any PO in the PO group is located;

a starting position of a slot in which any PO in the PO group is located;

a starting position of a subframe in which any PO in the PO group is located;

a starting position of a frame in which any PO in the PO group is located;

a starting time domain resource in the time domain resources of the PO group; and a time domain resource at y/x of the time domain resources occupied by the PO group, wherein x represents a total number of time domain resources occupied by the PO group, and y is a positive integer less than or equal to x.

18. The network device of claim 16, wherein the first PO group comprises part or all of POs within a first paging frame (PF) in which the first PO is located; or the first PO group comprises part or all of POs within a transmission cycle of a first SSB burst set in which the first PO is located; or the first PO group comprises part or all of POs within a first paging cycle in which the first PO is located; or the first PO group comprises part or all of POs within a first discontinuous reception (DRX) cycle in which the first PO is located.

19. The network device of claim 16, wherein a number of PFs in which a PO in the first PO group is located is M, and M is a positive integer; or a number of SSB burst sets in which the PO in the first PO group is located is P, and P is a positive integer; or a number of paging cycles in which the PO in the first PO group is located is Q, and Q is a positive integer; or a number of DRX cycles in which the PO in the first PO group is located is K, and K is a positive integer.

20. The network device of claim 16, wherein the first PO group comprises one or more POs.

* * * * *